US009098451B1

(12) United States Patent
Rakitzis et al.

(10) Patent No.: US 9,098,451 B1
(45) Date of Patent: Aug. 4, 2015

(54) SHINGLED REPAIR SET FOR WRITING DATA

(71) Applicant: Igneous Systems, Inc., Seattle, WA (US)

(72) Inventors: Triantaphyllos Byron Rakitzis, Seattle, WA (US); Jeffrey Douglas Hughes, Seattle, WA (US); Kiran V. Bhageshpur, Seattle, WA (US)

(73) Assignee: Igneous Systems, Inc., Seattle, WA (US)

( * ) Notice: Subject to any disclaimer, the term of this patent is extended or adjusted under 35 U.S.C. 154(b) by 0 days.

(21) Appl. No.: 14/550,466

(22) Filed: Nov. 21, 2014

(51) Int. Cl.
  *G06F 11/00* (2006.01)
  *G06F 11/14* (2006.01)
  *G06F 11/10* (2006.01)

(52) U.S. Cl.
  CPC ........ *G06F 11/1448* (2013.01); *G06F 11/1084* (2013.01); *G06F 2201/84* (2013.01)

(58) Field of Classification Search
  CPC ............ G06F 11/1092; G06F 11/1088; G06F 11/1084
  See application file for complete search history.

(56) References Cited

U.S. PATENT DOCUMENTS

| 6,615,314 | B1 * | 9/2003 | Higaki et al. ................. 711/114 |
| 6,647,514 | B1 | 11/2003 | Umberger et al. |
| 7,305,579 | B2 | 12/2007 | Williams |
| 7,451,344 | B1 | 11/2008 | Rothberg |
| 8,006,128 | B2 | 8/2011 | Olster |
| 8,438,420 | B1 | 5/2013 | Dutch et al. |
| 8,751,739 | B1 * | 6/2014 | Bjornsson ..................... 711/112 |
| 8,751,861 | B2 | 6/2014 | Nair et al. |
| 8,850,108 | B1 * | 9/2014 | Hayes et al. .................. 711/103 |
| 2006/0015771 | A1 * | 1/2006 | Van Gundy et al. .............. 714/7 |
| 2006/0190683 | A1 * | 8/2006 | Takase .......................... 711/114 |
| 2007/0083723 | A1 | 4/2007 | Dey et al. |
| 2007/0220313 | A1 * | 9/2007 | Katsuragi et al. ................. 714/6 |
| 2008/0126844 | A1 * | 5/2008 | Morita et al. ..................... 714/6 |
| 2009/0172285 | A1 | 7/2009 | Smith et al. |
| 2010/0306409 | A1 | 12/2010 | Jansen et al. |
| 2011/0029809 | A1 * | 2/2011 | Dhuse et al. ...................... 714/6 |
| 2011/0282936 | A1 | 11/2011 | Chekhanovskiy et al. |
| 2011/0289378 | A1 * | 11/2011 | Grube et al. .................. 714/760 |
| 2012/0079317 | A1 | 3/2012 | Nelogal et al. |
| 2012/0303736 | A1 | 11/2012 | Novotny et al. |

(Continued)

OTHER PUBLICATIONS

Office Communication for U.S. Appl. No. 14/315,139 mailed on Sep. 4, 2014.

(Continued)

*Primary Examiner* — Yolanda L Wilson
(74) *Attorney, Agent, or Firm* — John W. Branch; Lowe Graham Jones PLLC

(57) ABSTRACT

Embodiments are directed towards writing data to a shingle of storage devices enabling storage devices not in the shingle to be turned off. A shingle may be a sub-group of more than one storage devices selected from a larger group of storage devices. A plurality of data repair sets may be written to various subsets of the storage devices in the shingle. Each data repair set may include data block(s) and repair block(s)—with each block being stored on a different storage device in the shingle. When a condition is satisfied, the shingle may be modified to either remove at least one storage device from the shingle, add at least one other storage device to the shingle, or both. In various embodiments, the at least one other storage device may be a storage device in the group of storage devices that is not currently included in the shingle.

26 Claims, 11 Drawing Sheets

(56) References Cited

U.S. PATENT DOCUMENTS

| | | |
|---|---|---|
| 2012/0317254 A1 | 12/2012 | Chekhanovskiy et al. |
| 2013/0024723 A1* | 1/2013 | Govindasamy .............. 714/6.22 |
| 2013/0054913 A1 | 2/2013 | Maeda et al. |
| 2013/0290775 A1 | 10/2013 | Tucek et al. |
| 2014/0101283 A1 | 4/2014 | Alnafoosi et al. |
| 2014/0337530 A1 | 11/2014 | Amishav et al. |
| 2014/0365819 A1 | 12/2014 | Cooper et al. |

OTHER PUBLICATIONS

Office Communication for U.S. Appl. No. 14/315,139 mailed on Dec. 26, 2014.

Office Communication for U.S. Appl. No. 14/454,661 mailed on Nov. 5, 2014.

Office Communication for U.S. Appl. No. 14/272,303 mailed on Dec. 22, 2014.

Office Communication for U.S. Appl. No. 14/315,139 mailed on May 7, 2015 (15 pages).

Office Communication for U.S. Appl. No. 14/272,303 mailed on May 7, 2015 (7 pages).

Office Communication for U.S. Appl. No. 14/663,359 mailed on May 18, 2015 (11 pages).

* cited by examiner

SHINGLED REPAIR SET FOR WRITING DATA

TECHNICAL FIELD

The present invention relates generally to data storage, and more particular, but not exclusive, to employing and shifting shingles of storage devices across a group of storage devices.

BACKGROUND

The use of distributed storage systems has grown in abundance over the past few years. Modern enterprises continue to increase the amount of data generated and retained for long periods of time. This explosion in data has led to larger and larger data storage systems. In some cases, these data storage systems may include thousands of storage devices. Unfortunately, as number of storage devices in a storage system increases so does power consumption by the storage devices, peripheral computers and/or circuitry, cooling systems, and the like. Similarly, the probability of storage device failures within a storage system also increases. Accordingly, data storage systems may be arranged to employ error/data recovery techniques, such as erasure coding for reducing the risk of data loss. A storage system may employ one or more data recovery techniques to restore data lost or corrupted due to storage device failure. However, as size of the data storage and the number of storage devices continues to increase, data restoration may increasingly take a disadvantageously long time to complete, and consume even more power. Thus, it is with respect to these considerations and others that the invention has been made.

BRIEF DESCRIPTION OF THE DRAWINGS

Non-limiting and non-exhaustive embodiments of the present invention are described with reference to the following drawings. In the drawings, like reference numerals refer to like components throughout the various figures unless otherwise specified.

For a better understanding of the present invention, reference will be made to the following Detailed Description, which is to be read in association with the accompanying drawings, wherein.

DETAILED DESCRIPTION

Figure 1:
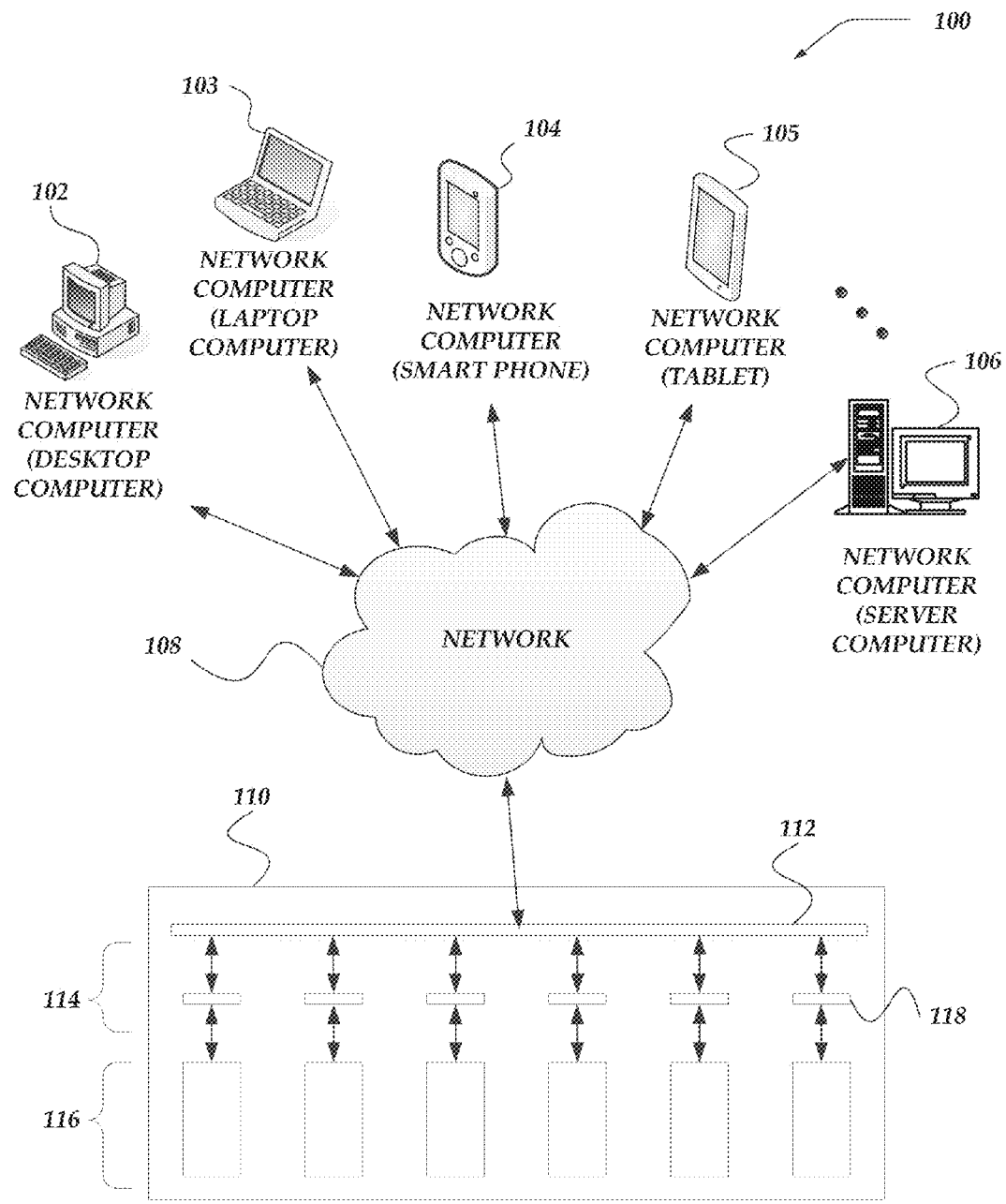
FIG. 1 is a system diagram of an environment in which embodiments of the invention may be implemented.

Various embodiments are described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may be entirely hardware embodiments, entirely software embodiments, or embodiments combining software and hardware aspects. The following detailed description should, therefore, not be limiting.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the tem "storage device" refers to various apparatus for digitally storing information, generally for use by computers. Storage devices may be fixed or removable non-volatile memory systems, such as, for example, hard disk drives (e.g., magnetic hard drives), magnetic tape, optical drives, solid state drives (SSD), flash memory storage, or the like. Typically, one or more storage devices may be arranged to store information for use in a computer system. In some embodiments, a storage device may also be referred to as a storage drive.

As used herein, the term "repair set" may refer to a plurality of logical blocks that can be written to a plurality of storage devices, where each block is written to a different storage device. In various embodiments, some of the blocks may include data (i.e., data blocks) and other blocks may include parity or repair information (i.e., repair blocks). In this way, at least some of the data blocks may be recovered in the event of a device failure. In some embodiments, the repair set may be based on a forward error correction algorithm, such as erasure encoding. The size of a repair set, e.g., the number of logical blocks, both data blocks and repair blocks, may be determined based on a level of protection against a predetermined number of device failures.

As used herein, the term "shingle" refers to a logical organization of a sub-group (more than one storage device) from a larger group of storage devices. The group of storage devices may be a plurality of storage devices locally and/or remotely located in one or more computers, chassis, racks, data centers, or the like, which may be accessed over a network as a distributed storage system. In various embodiments described herein, the shingle may be modified, such as adding and/or deleting one or more storage devices in the shingle based on various conditions, policies and/or parameters. As a result, a modified shingle includes at least one different storage device as well at least one of the same storage devices included in the pre-modified shingle. Also, the modified shingle can have the same amount of storage devices or a different amount of storage devices as the pre-modified shingle. Additionally, the pre-modified shingle is the immediately preceding shingle for the modified shingle.

In various embodiments, a shingle may include a "head" (or "head storage device") and a "tail" (or "tail storage device"). In some embodiments, the head may refer to one or more storage devices in a shingle that have a highest ordered position among the storage devices in the shingle. In contrast, a tail may refer to one or more storage devices in a shingle that have a lowest ordered position among the storage devices in the shingle. In other embodiments, the head may refer to one or more storage devices in a shingle that were most recently added to the shingle (e.g., newest storage devices in the shingle). And a tail may refer to one or more storage devices in a shingle that were the least recently added to the shingle (e.g., oldest storage devices in the shingle). As described herein, as a shingle shifts, storage devices may be added to the head of the shingle (which may become the new head of the shingle), and storage devices at the tail may be removed from the shingle, which is similar to a FIFO (first in, first out) construct.

As used herein, the term "multi-storage-device chassis" refers to a storage architecture that includes a chassis, backplane, and various other circuitry (e.g., power supply, a centralized chassis controller, or the like) for enabling use of a plurality of storage devices. In some embodiments, a multi-storage-device chassis may be in a non-RAID (non-Redundant Array of Independent Disks) architecture, such as, for example, a JBOD (or "just a bunch of disks") architecture. However, embodiments are not so limited, and in other embodiments, the multi-storage-device chassis may be in a RAID architecture. In some embodiments, storage devices may connect to the backplane through a controller. However, embodiments, are not limited to the use of multi-storage-device chassis and/or controllers and other storage system architectures that utilize a plurality of storage devices may also be utilized with embodiments described herein.

As used herein, the term "controller" or "controller computer" may refer to a computer or physical device that is separate from a typical/non-specific/general storage device (or storage drive) and separate from a multi-storage-device chassis, but can be electrically coupled between an individual storage device and the chassis backplane. In various embodiments, the controller may have dimensions that fit into the form factor shadow of the storage device so that it can fit into a typical multi-storage-device chassis.

In some embodiments, the controller may be configured to individually control and/or manage the storage device that it is connected to, such as controlling power supplied to the storage device. So, unlike a master computer that would control/manage a plurality of storage devices, each controller individually controls/manages its own corresponding individual storage device. Although, in various embodiments controllers may communicate with each other to coordinate and perform tasks between a plurality of storage devices, such as, but not limited to reads and/or writes. In some embodiments, controllers can communicate locally (without accessing the chassis interface for communication with external/remote devices) with other controllers through the Ethernet switch fabric interface of the chassis via Ethernet protocols.

It should be noted that these examples of controller functionality are for illustration purposes and should not be construed as limiting, and that each controller may perform additional tasks and/or actions at the individual storage device level and/or coordinate with each other to perform tasks and/or actions across a plurality of storage devices. For example, controllers may also determine power-up sequences for the storage devices and/or monitoring various performance characteristics of its corresponding storage device (e.g., power consumption, temperature, response time/latency, or the like) to provide comprehensive storage device analytics and diagnostics at the individual storage device level. This type of monitoring can allow a controller to identify that its corresponding storage device may be about to fail (e.g., changes in power consumption, temperatures above a threshold, increased latency, or the like), and coordinate with other controllers (or an administrator) to backup the potentially failing storage device's data, halt future write operations to potentially failing storage device, or the like—all while being able to control which storage devices are part of a group of storage devices, which storage devices are included in shingle, and which storage devices can be powered down.

In various embodiments, each controller may make each separate storage device individually network accessible by other controllers and/or network computers. For example, in various embodiments, the controller can accept data in a storage device supported protocol through a storage-device connector and convert it into an Ethernet supported protocol for output through the backplane connector and over the Ethernet switch fabric interface to other network computers (or controllers). Similarly, the controller can accept data in an Ethernet supported protocol through the backplane connector and convert it to a storage device supported protocol for output through the storage-device connector to the storage device.

The following briefly describes embodiments of the invention in order to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detail description this is presented later.

Briefly stated, embodiments are directed towards writing data to a shingle of storage devices enabling at least a portion of storage devices of a larger group to be powered down. In various embodiments, a shingle of storage devices may be established or otherwise identified. The shingle may refer to a logical organization of a sub-group of more than one storage device, which is selected from a larger group of storage devices. As described herein, in some embodiments, at least the storage devices in the shingle may be ordered such that the shingle includes a head and a tail—similar to a FIFO queue.

A plurality of data repair sets may be written to one or more subsets of the storage devices in the shingle. In various embodiments, one or more data repair set may be written to a different subset of storage devices in the shingle. Each data repair set may include at least one data block and at least one repair block, and each block may be stored on a different storage device in the one or more subsets in the shingle.

When a shingle-modification condition is satisfied, the shingle may be modified to either remove at least one storage device from the shingle, to add at least one other storage device to the shingle, or both. In various embodiments, the at least one other storage device may be a storage device in the group of storage devices but is not currently included in the shingle. In at least one of the various embodiments, the at least one removed storage device may be removed from a logical tail of the shingle's organization of the sub-group of storage devices and the at least one other storage device is added to a logical head of the shingle's organization of the sub-group of storage devices. In various embodiments, modifying the shingle may include wrapping the shingle to a lowest ordered storage device in the group of storage devices that was previously removed from the shingle.

In some embodiments, the at least one removed storage device may be powered down. In other embodiments, the at least one added other storage device may be powered up.

In various embodiments, the shingle-modification condition may be satisfied when a storage capacity of at least one of the storage devices in the shingle exceeds a predetermined threshold, satisfying the condition. In various other embodiments, the shingle-modification condition may be satisfied based on a predetermined time period. In other embodiments, a new group of storage devices may be determined when a capacity condition is satisfied for the group of storage device. From this new group of storage devices, a new shingle may be determined that logically organizes a new sub-group of storage devices from the larger new group of storage devices.

Illustrative Operating Environment

FIG. 1 shows components of one embodiment of an environment in which various embodiments of the invention may be practiced. Not all of the components may be required to practice the various embodiments, and variations in the arrangement and type of the components may be made without departing from the spirit or scope of the invention. As shown, system 100 of FIG. 1 may include multi-storage-device chassis 110, network computers 102-106, and network 108.

Network computers 102-106 may communicate with multi-storage-device chassis 110 via network 108. Network 108 may be configured to couple network computers with other computing devices, including network computers 102-106, multi-storage-device chassis 110, other networks, or the like. In various embodiments, information communicated between devices may include various kinds of information, including, but not limited to, processor-readable instructions, client requests, server responses, program modules, applications, raw data, control data, video data, voice data, image data, text data, or the like. In some embodiments, this information may be communicated between devices using one or more technologies and/or network protocols.

In some embodiments, network 108 may include various wired networks, wireless networks, or any combination thereof. In various embodiments, network 108 may be enabled to employ various forms of communication technology, topology, computer-readable media, or the like, for communicating information from one electronic device to another. For example, network 108 can include—in addition to the Internet—LANs, WANs, Personal Area Networks (PANs), Campus Area Networks (CANs), Metropolitan Area Networks (MANs), direct communication connections (such as through a USB port), or the like, or any combination thereof.

In various embodiments, communication links within and/or between networks may include, but are not limited to, twisted wire pair, optical fibers, open air lasers, coaxial cable, plain old telephone service (POTS), wave guides, acoustics, full or fractional dedicated digital lines (such as T1, T2, T3, or T4), E-carriers, Integrated Services Digital Networks (ISDNs), Digital Subscriber Lines (DSLs), wireless links (including satellite links), or other links and/or carrier mechanisms known to those skilled in the art. Moreover, communication links may further employ any of a variety of digital signaling technologies, including without limit, for example, DS-0, DS-1, DS-2, DS-3, DS-4, OC-3, OC-12, OC-48, or the like. In some embodiments, a router (or other intermediate network device) may act as a link between various networks—including those based on different architectures and/or protocols—to enable information to be transferred from one network to another. In other embodiments, network computers and/or other related electronic devices could be connected to a network via a modem and temporary telephone link. In essence, the network may include any communication technology by which information may travel between computing devices.

Network 108 may, in some embodiments, include various wireless networks, which may be configured to couple various portable network devices, remote computers, wired networks, other wireless networks, or the like. Wireless networks may include any of a variety of sub-networks that may further overlay stand-alone ad-hoc networks, or the like, to provide an infrastructure-oriented connection for at least network computers 103-105. Such sub-networks may include mesh networks, Wireless LAN (WLAN) networks, cellular networks, or the like. In at least one of the various embodiments, the system may include more than one wireless network.

Network 108 may employ a plurality of wired and/or wireless communication protocols and/or technologies. Examples of various generations (e.g., third (3G), fourth (4G), or fifth (5G)) of communication protocols and/or technologies that may be employed by the network may include, but are not limited to, Global System for Mobile communication (GSM), General Packet Radio Services (GPRS), Enhanced Data GSM Environment (EDGE), Code Division Multiple Access (CDMA), Wideband Code Division Multiple Access (W-CDMA), Code Division Multiple Access 2000 (CDMA2000), High Speed Downlink Packet Access (HSDPA), Long Term Evolution (LTE), Universal Mobile Telecommunications System (UMTS), Evolution-Data Optimized (Ev-DO), Worldwide Interoperability for Microwave Access (WiMax), time division multiple access (TDMA), Orthogonal frequency-division multiplexing (OFDM), ultra wide band (UWB), Wireless Application Protocol (WAP), user datagram protocol (UDP), transmission control protocol/Internet protocol (TCP/IP), any portion of the Open Systems Interconnection (OSI) model protocols, session initiated protocol/real-time transport protocol (SIP/RTP), short message service (SMS), multimedia messaging service (MMS), or any of a variety of other communication protocols and/or technologies. In essence, the network may include communication technologies by which information may travel between network computers 102-106, multi-storage-device 110, other computing devices not illustrated, other networks, or the like.

In various embodiments, at least a portion of the network may be arranged as an autonomous system of nodes, links, paths, terminals, gateways, routers, switches, firewalls, load balancers, forwarders, repeaters, optical-electrical converters, or the like, which may be connected by various communication links. These autonomous systems may be configured to self-organize based on current operating conditions and/or rule-based policies, such that the network topology of the network may be modified.

At least one embodiment of network computers 102-106 is described in more detail below in conjunction with network computer 200 of FIG. 2A. Briefly, in some embodiments, network computers 102-106 may be configured to communicate with multi-storage-device chassis 110 to enable distributed storage. Generally, network computers 102-106 may include various types of client and/or server computers. In some embodiments, network computers 102-106 may communicate with individual controllers (e.g., controllers 114) for each storage device associated with multi-storage-device chassis 110 (e.g., storage devices 116) to perform reads and writes of data, access information and/or analytics, or the like. In various embodiments, network computers 102-106 may be remote and/or separate from chassis 110 and controllers 114. In other embodiments, network computers 102-106 may communicate directly with storage devices 116 or with a master computer that can coordinate data reads and writes among storage devices 116.

In some embodiments, at least some of network computers 102-106 may operate over a wired and/or wireless network (e.g., network 108) to communicate with other computing devices and/or multi-storage-device chassis 110. Generally, network computers 102-106 may include computing devices capable of communicating over a network to send and/or receive information, perform various online and/or offline activities, or the like. It should be recognized that embodiments described herein are not constrained by the number or type of network computers employed, and more or fewer network computers—and/or types of network computers—than what is illustrated in FIG. 1 may be employed.

Devices that may operate as network computers 102-106 may include various computing devices that typically connect to a network or other computing device using a wired and/or wireless communications medium. Network computers may include portable and/or non-portable computers. In some embodiments, network computers may include client computers, server computers, or the like. Examples of network computers 102-106 may include, but are not limited to, desktop computers (e.g., network computer 102), server computers (e.g., network computer 106), personal computers, multiprocessor systems, microprocessor-based or programmable electronic devices, network PCs, laptop computers (e.g., network computer 103), smart phones (e.g., network computer 104), tablet computers (e.g., network computer 105), cellular telephones, display pagers, radio frequency (RF) devices, infrared (IR) devices, Personal Digital Assistants (PDAs), handheld computers, wearable computing devices, entertainment/home media systems (e.g., televisions, gaming consoles, audio equipment, or the like), household devices (e.g., thermostats, refrigerators, home security systems, or the like), multimedia navigation systems, automotive communications and entertainment systems, integrated devices combining functionality of one or more of the preceding devices, or the like. As such, network computers 102-106 may include computers with a wide range of capabilities and features. In some embodiments, network computers 102-106 may be referred to as remote computers, because they access and/or store data on a different computer/device, such as multi-storage-device chassis 110.

In some embodiments, multi-storage-device chassis 110 may be maintained at a location that is separate from network devices 102-106 (e.g., cloud computing/storage that utilize distributed storage systems). But in other embodiments, multi-storage-device chassis 110 may be incorporated in one or more of network computers 102-106.

Network computers 102-106 may access and/or employ various computing applications to enable users of network computers to perform various online and/or offline activities. Such activities may include, but are not limited to, generating documents, gathering/monitoring data, capturing/manipulating images, managing media, managing financial information, playing games, managing personal information, browsing the Internet, or the like. In some embodiments, network computers 102-106 may be enabled to connect to a network through a browser, or other web-based application.

Network computers 102-106 may further be configured to provide information that identifies the network computer. Such identifying information may include, but is not limited to, a type, capability, configuration, name, or the like, of the network computer. In at least one embodiment, a network computer may uniquely identify itself through any of a variety of mechanisms, such as an Internet Protocol (IP) address, phone number, Mobile Identification Number (MIN), media access control (MAC) address, electronic serial number (ESN), or other device identifier.

Multi-storage-device chassis 110 may include backplane 112 and may be configured to house a plurality of separate storage devices, such as storage devices 116, which may include more or less devices than what is illustrated in the figure. In some embodiments, each storage device may utilize (e.g., be fastened to) a storage carrier or tray (not shown) for insertion into the chassis. However, in some embodiments, the storage devices may be affixed directly to the chassis. As described herein, a separate controller (e.g., controllers 114) may be coupled to each separate storage device and the combination of the storage device and controller may be coupled to backplane 112. Each of controllers 114 may provide a separately addressable network interface for each of storage devices 116.

In various embodiments, chassis 110 may be configured and/or modified to provide Ethernet access to backplane 112. In at least one embodiment, backplane 112 may provide Ethernet access to each of controllers 114 through an Ethernet switch fabric interface that serially connects backplane connectors. In some embodiments, chassis 110 may include an Ethernet port and/or interface component for connecting chassis 110 to network 108.

Controllers 114 may directly communicate with network computers 102-106. In various embodiments, each of controllers 114 may convert data received from its corresponding storage device 116 into an Ethernet protocol and communicated to network computers 102-106 via backplane 112 and network 108. Similarly, each controller may convert data received from network computers 102-106 (via network 108 and the Ethernet connection supported by backplane 112) into a storage device protocol for accessing its own corresponding storage device.

In various embodiments, controllers 114 may coordinate which of storage devices 116 are included in a shingle, which storage devices are added or removed from a shingle, which storage devices may be powered up or down, or the like.

Since storage devices 116 can be of any typical/non-specific/general storage device/agnostic, each of controllers 114 may perform different types of data protocol conversions depending on the type storage device that it is coupled with. In this way, each storage device can be individually addressable and network computers 102-106 can individually access each separate storage device 116 via an Ethernet protocol without having to utilize a centralized/master controller—either a chassis controller or a standalone computer that centrally manages access to each storage device 116. So, in various embodiment, each separate controller (of controllers 114), and thus each separate storage device, is individually addressable and can be individually accessed by network devices 102-106. Generally, storage devices 116 may be referred to as a storage system.

In various embodiments, controllers 114 may communicate with each other via the Ethernet connection of backplane 112 to employ various storage device management actions, monitoring actions, or the like. So in some embodiments, controllers 114 may communicate with each other—independent of a chassis controller or other primary/main/master/coordinator computer—to perform various actions (some of which may be done in parallel), including, but not limited to, data reads, data writes, data recovery, or the like.

For example, in some embodiments, the controllers may communicate with each other to perform distributed data storage actions among a plurality of storage devices. In one non-limiting example, network computer 102 may provide a write request to controller 118 (in some embodiments, this request may go through a load balancer or other routing device). Controller 118 may work together with the separate controllers 114 to coordinate the write request across one or more of storage devices 116 (even if the network computer is unaware of the other controllers and/or storage devices). In this example, controller 118 may coordinate with the other controllers of controllers 114 to determine which controller/storage devices will store what data.

In various embodiments, this data management coordination may include the controllers communicating with each other to manage which storage devices are included in a shingle at a given time, when to modify or shift a shingle, determine which storage devices to remove from the shingle, determine which storage devices to add to the shingle and the like, as described herein. It should be noted that in some embodiments a single controller may be identified as a master controller for controlling/managing data reads, writes, and/or shingle management. In other embodiments, another network computer (e.g., a server computer) can perform this management of reads, writes, and shingle management.

Since each controller 114 is network accessible (e.g., IP addressable), in some embodiments, network computer 102 may be able to individually access each storage device 116 and indicate which storage devices will store what data.

Similarly, the controllers may communicate with each other to recover lost data. For example, assume there are 20 storage devices and data is written to various subsets of these storage devices via repair sets. If one of the storage devices fails, then the other storage devices associated with the repair sets in the failed storage device may be utilized to rebuild the lost data of the failed storage device, while other storage devices continue to perform data reads, writes, or the like.

In some other embodiments, controllers 114 may manage and coordinate power utilization of storage devices 116. For example, storage devices not currently included in a shingle may be powered down. This device can later be powered back up for read data from the device or if the device is later added to another shingle.

In various embodiments, power consumption management and/or power management of a storage device may include enabling and/or disabling various features of a storage device. For example, a controller can manage the power consumption of its correspondingly coupled storage device by providing different commands (e.g., through the command set) to the storage device to enable/disable various features of the storage device. In other embodiments, power management may include switching the power rails (e.g., +3.3V, +5V and +12V) on and off.

In various embodiments, controllers 114 may communicate with each other to coordinate a schedule for powering up storage devices 116. In some embodiments, each controller 114 may be operative to determine parameters and/or capabilities of its corresponding storage device. This determination may be based on a type of connector that is coupled to the storage device (i.e., the first connector), previously stored power consumption profile of the storage device, drive identifier, or the like.

Based on the parameters and/or capabilities of each storage device in the chassis, controllers 114 may determine an efficient way of powering up the storage devices to reduce spikes in power consumption by the storage devices (i.e., each controller may determine various power-up sequences for its correspondingly coupled storage device). In particular, mechanical drives (e.g., HDDs) may have an initial spike in power consumption when they turn on due to the electrical properties of powering up the motor to drive the disk. This power consumption can be compared to that of SSDs, which typically is a more step function when the drive is powered up.

Since each controller can manage the power supplied to its corresponding storage device, and since there is no need for the storage devices to be of a uniform type (or model, or from a same manufacturer), the controllers as a group can determine and employ a power-up schedule that can allow one or more of the storage devices to power up before other storage devices are powered up. For example, in some embodiments, each of the mechanical drives (e.g., HDD) may be power up before the SSDs on the same chassis. Similarly, each the power up of each storage device may be slightly staggered to further reduce the issues that can arise from a spike in power consumption. By optimizing the schedule for powering storage devices 116.

Similarly, a controller can individually and dynamically adjust the power of its corresponding storage device at any given time, such as if it is added or removed from a shingle. In this way, each controller can individually or collectively monitor the temperature of the various storage devices and adjust their power individually.

This type of device-specific power control can enable a controller to reduce a storage device's power—e.g., if the storage device has a temperature above a threshold in an attempt to give the storage device time to cool down. In other embodiments, a controller can increase or decrease the power supplied to its correspondingly coupled storage device based on trade-offs between power consumption, speed of accessing data, regularity or frequency of access requests, or the like. In yet other embodiments, a plurality of controllers can coordinate to reduce power consumption on a per storage device basis across a plurality of storage devices. So, in some embodiments, the controller may individually monitor and adjust the power supplied to an individual storage device or may work collectively to manage/adjust the power supplied to the plurality of storage devices.

This type of control at the storage device or drive level can allow for reduced power consumption during various times of the day. For example, if some storage devices are idle for a predetermined time and the current time is at a peak price for energy (e.g., dollars per kilowatt used), then the controllers for those storage devices may individually reduce the power supplied to those storage devices—while other storage devices (that are accessed more recently) are maintained at a higher power. Therefore, a user of the chassis can save money on energy costs without greatly affecting performance.

Since each separate storage device is managed by a separate controller, each controller can provide individualized management and/or monitoring of a corresponding storage device. For example, in some embodiments, a controller can monitor power consumption, temperature, or other performance characteristics of the coupled storage device and provide those monitored analytics to one of network computers 102-106 or to another controller. In at least one such embodiment, if a controller determines that its corresponding storage device is operating at a temperature above a given threshold, the controller can reduce the power consumption of the storage device or power it down completely (e.g., until the storage device temperature falls below another threshold value).

In other embodiments, the controller may identify that its corresponding storage device is exhibiting performance characteristics of a failing storage device (e.g., extra power consumption, overheating, excessive latency (e.g., above a time threshold) while performing a read/write operation, or the like), then the controller can notify the other controllers (or one or more of network devices 102-106) that its storage device may be about to fail. Once notified of the possible failure, the controllers can take steps to anticipate the failure. Such anticipation may include removing the failing storage device from a shingle, initiate copying of the failing storage device to a spare storage device (that also has a corresponding controller), or the like.

In various other embodiments, the combined/coupled storage device and controller may utilize hot swap features of chassis 110.

In some embodiments, controllers 114 may cooperatively coordinate with each other in a peer-to-peer architecture to control/manage operations of each correspondingly coupled storage device 116, as described herein. In other embodiments, controllers 114 may cooperatively coordinate storage-device-operation control/management with each other as more of a server-to-peer architecture, where one of controllers 114 may operate as a master controller and one or more of the other controllers of controllers 114 may operate as slave controllers.

In at least one such architecture, the slave controllers may provide information (e.g., storage-device characteristics, performance parameters, or the like) to the master controller. The master controller can determine storage-device power-up sequences and/or schedules, identify potentially failing storage devices, coordinate backup and/or recovery of a potentially failing (or already failed) storage device, or the like, as described herein. Based on these determinations, the master controller may provide instructions to one or more of the slave controllers for managing their correspondingly coupled storage devices. For example, the master controller may provide separate instructions to each slave controller, which may separately indicate when and/or how a slave controller is to power-up it's correspondingly coupled storage device (noting that the master controller may also have a correspondingly coupled storage device that may be managed/controlled in conjunctions with the other storage devices). In other embodiments, the controllers may communicate information amongst each other without directly accessing, managing, or otherwise controlling the storage devices.

In various other embodiments, a network computer (e.g., one of network computers 102-106, which may be remote to chassis 110) and controllers 114 may operate in a server-to-peer architecture to control/manage operations of one or more storage devices 116 in chassis 110 (or storage devices in multiple chassis)—similar to that which is described above. In at least one such embodiment, the network computer may operate as a master network computer and controllers 114 may operate as slave controllers. In various embodiments, the network computer (e.g., a master network computer) may coordinate and/or instruct each of controllers 114 (e.g., slave controllers) to control/manage operations of each correspondingly coupled storage device 116. For example, controllers 114 may provide information (e.g., storage-device characteristics, performance parameters, or the like) to the master network computer. The master network computer can determine storage-device power-up sequences and/or schedules, identifying potentially failing storage devices, coordinate backup and/or recovery of a potentially failing (or already failed) storage device, or the like, as described herein. Based on these determinations, the master network computer may provide instructions to one or more of controllers 114 for managing their correspondingly coupled storage devices. For example, the master network computer may provide separate instructions to each controller, which may separately indicate when and/or how a controller is to power-up a correspondingly coupled storage device.

It should be noted that these architectures are not to be construed as exhaustive or limiting, but rather, other architectures may be employed in accordance with embodiments described herein. For example, in various embodiments, network computers 102-106 and/or controllers 114 may operate in various different architectures including, but not limited to, a peer-to-peer architecture, peer-to-server architecture, server-to-server architecture, or the like, to control/manage the operations of one or more of storage devices 116. As described herein, the control/management of storage-device operations may include, but is not limited to determining storage-device power-up sequences and/or schedules, identifying potentially failing storage devices, coordinate backup and/or recovery of a potentially failing (or already failed) storage device, or the like.

Should also be recognized that other types of storage device power management techniques may be employed. For example, in some embodiments, chassis 110 may be enabled to manage shingles, data read/writes, power up or power down of various storage devices, or the like, without the need for individual controllers for each storage device.

Illustrative Network Computer

Figure 2A:
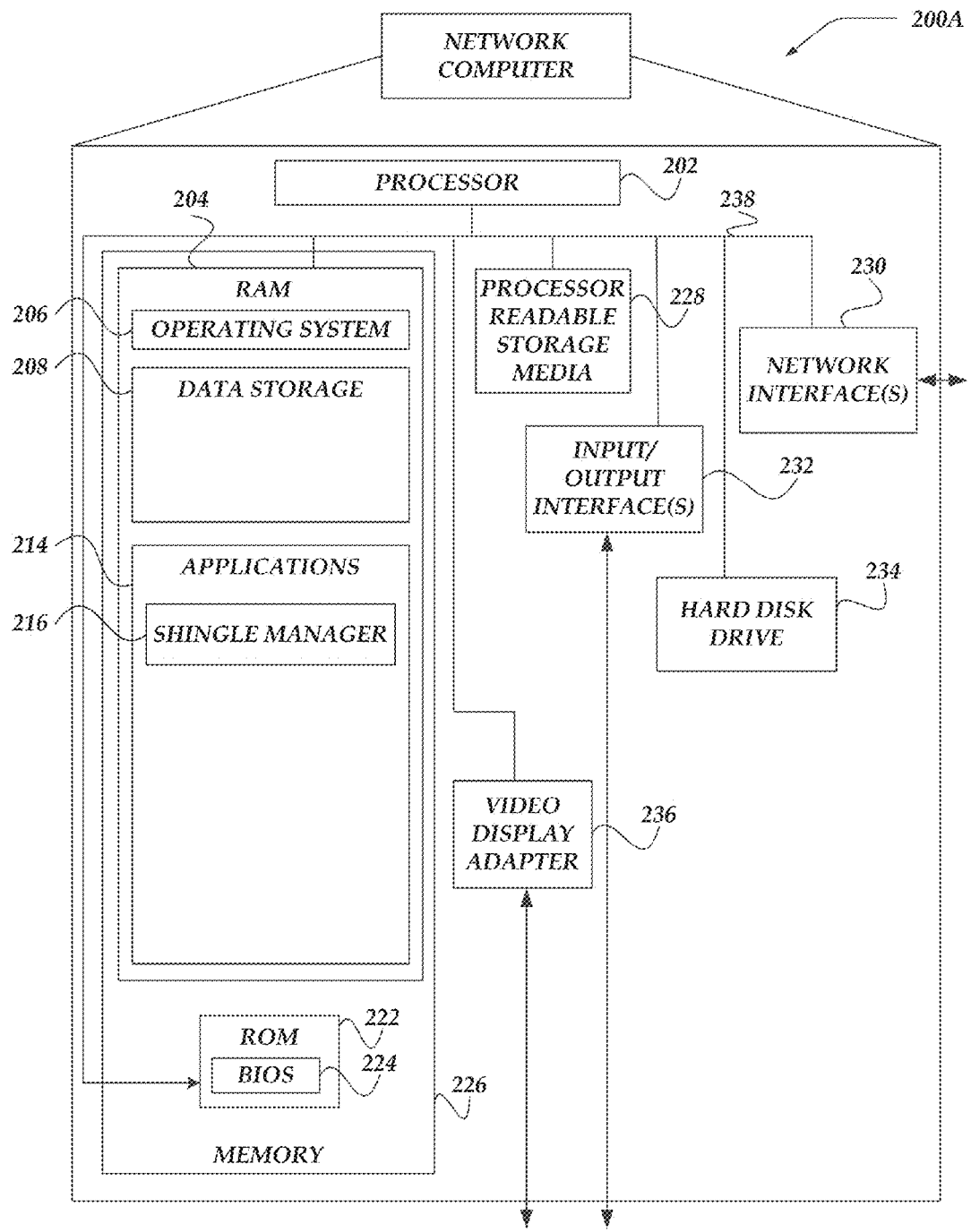
FIG. 2A shows an embodiment of a network computer that may be included in a system such as that shown in FIG. 1.

FIG. 2A shows one embodiment of a network computer 200 that may include many more or less components than those shown. The components shown, however, are sufficient to disclose an illustrative embodiment for practicing the invention. Network computer 200 may represent, for example network computers 102-106 of FIG. 1, and/or other network devices.

Network computer 200 may be configured to operate as a server, client, peer, a host, or other computing device. In general, network computer 200 may be a desktop computer, mobile computer (e.g., laptop computers, smart phones, tablets, or the like), server computer, or any other network computer that can communicate through a network to access and/or store data at a storage system, such as a remote/secondary location (i.e., multi-storage-device chassis 110 of FIG. 1).

Network computer 200 may include processor 202, processor readable storage media 228, network interface 230, an input/output interface 232, hard disk drive 234, video display adapter 236, and memory 226, all in communication with each other via bus 238. In some embodiments, processor 202 may include one or more central processing units.

Network interface 230 includes circuitry for coupling network computer 200 to one or more networks, and is constructed for use with one or more communication protocols and technologies including, but not limited to, protocols and technologies that implement any portion of the OSI model, GSM, CDMA, time division multiple access (TDMA), UDP, TCP/IP, SMS, MMS, GPRS, WAP, UWB, WiMax, SIP/RTP, EDGE, W-CDMA, LTE, UMTS, OFDM, CDMA2000, EV-DO, HSDPA, or any of a variety of other wireless communication protocols. Network interface 230 is sometimes known as a transceiver, transceiving device, or network interface card (NIC). In various embodiments, network interface unit 230 may enable network computer 200 to access and/or store data on one or more storage devices associated with a multi-storage-device chassis, such as multi-storage-device chassis 110 of FIG. 1.

Network computer 200 may comprise input/output interface 232 for communicating with external devices, such as a keyboard, or other input or output devices not shown in FIG. 2A. Input/output interface 232 can utilize one or more communication technologies, such as Universal Serial Bus (USB), infrared, WiFi, WiMax, Bluetooth™, wired technologies, or the like.

Memory 226 may include various types of storage technologies, which may include various types of non-volatile storage, volatile storage, or a combination thereof. Examples of memory 226 may include, but are not limited to Random Access Memory (RAM) (e.g., RAM 204), dynamic RAM (DRAM), static RAM (SRAM), Read-only Memory (ROM) (e.g., ROM 222), Electrically Erasable Programmable Read-only Memory (EEPROM), flash memory, hard disk drives, optical drives, magnetic computer storage devices, tape drives, floppy disk drives, or other processor-readable storage media. In some embodiments, memory 226 may include processor-readable transitory or non-transitory storage media. In various embodiments, memory 226 may include one or more caches.

Memory 226 may be utilized to store information, such as, but not limited to, processor-readable instructions (also referred to as computer-readable instructions), structured and/or unstructured data, program modules, or other data/information. In various embodiments, some of the data/information stored by memory 226 may be used by processor 202 to execute and/or perform actions. In some embodiments, at least some of the data/information stored by memory 226 may also be stored on another component of network computer 200, such as, but not limited to, process-readable storage media 228. Processor-readable storage media 228 may include one or more storage technologies, such as, but not limited to, those storage technologies described above for memory 226. In various embodiments, processor-readable storage media 228 may also be referred to as computer-readable storage media, processor-readable storage devices, and/or computer-readable storage devices. In some embodiments, process-readable storage media 228 may be removable or non-removable from network computer 200.

Memory 226 may include system firmware, such as BIOS 224, which may store instructions for controlling low-level operations of network computer 200. Memory 226 may also store operating system 206 for controlling the operation of network computer 200. In some embodiments, operating system 206 may include a general purpose operating system (e.g., UNIX, LINUX™, Windows™, OSX™, Windows Phone™, iOS™, Android™, or the like). The operating system functionality may be extended by one or more libraries, modules, plug-ins, or the like.

Memory 226 may include one or more data storage 208, which can be utilized by network computer 200 to store, among other things, applications 214 and/or other data. For example, data storage 208 may also be employed to store information that describes various capabilities of network computer 200. The information may then be provided to another device based on any of a variety of events, including being sent as part of a header during a communication, sent upon request, or the like. Data storage 208 may also include a database, text, spreadsheet, folder, file, or the like, that may be configured to maintain and store user account identifiers, user profiles, email addresses, IM addresses, and/or other network addresses; or the like. Data storage 208 may further include program code, data, algorithms, and the like, for use by a processor, such as processor 202 to execute and perform actions. In one embodiment, at least some of data store 208 might also be stored on another component of network computer 200, including, but not limited to processor-readable storage media 228, hard disk drive 234, or the like.

Applications 214 may include computer executable instructions that, when executed by network computer 200, transmit, receive, and/or otherwise process instructions and data. Examples of application programs may include, but are not limited to, calendars, search programs, email client applications, IM applications, SMS applications, contact managers, task managers, transcoders, schedulers, database programs, word processing programs, encryption applications, security applications, spreadsheet applications, games, and so forth.

A mobile computer may include a browser application that is configured to receive and to send web pages, web-based messages, graphics, text, multimedia, and the like. The mobile computer's browser application may employ virtually any programming language, including a wireless application protocol messages (WAP), and the like. In at least one embodiment, the browser application is enabled to employ Handheld Device Markup Language (HDML), Wireless Markup Language (WML), WMLScript, JavaScript, Standard Generalized Markup Language (SGML), HyperText Markup Language (HTML), eXtensible Markup Language (XML), HTML5, and the like.

Applications 214 may also include an application that can enable a user to individually access each separate controller (e.g., controllers 114 of FIG. 1) associated with each storage device (e.g., storage devices 116 of FIG. 1) through a network. So, in some embodiments, each controller (i.e., each storage device) may be individually network addressable by network computer 200. This access can enable a user to employ control (e.g., power/voltage changes, temperature and other storage device performance monitoring, or the like) over each individual storage devices within a multi-storage-device chassis.

In various embodiments, applications 214 may include shingle manager 216. Shingle manager 216 may manage and/or otherwise coordinate which storage devices are included in a shingle, determine which storage device(s) to remove from or add to a shingle during a shift/modification of the shingle, when to perform a shingle shift/modification, which storage devices to power up or down, or the like. In some embodiments, shingle manager 216 may also coordinate/manage the reading and/or writing of data to the storage devices in a shingle, such as through the use of repair sets.

In various embodiments, network computer 200 may perform at least a portion of the operations described herein to control/manage operations of one or more storage devices.

Illustrative Multi-Storage-Device Chassis

Figure 2B:
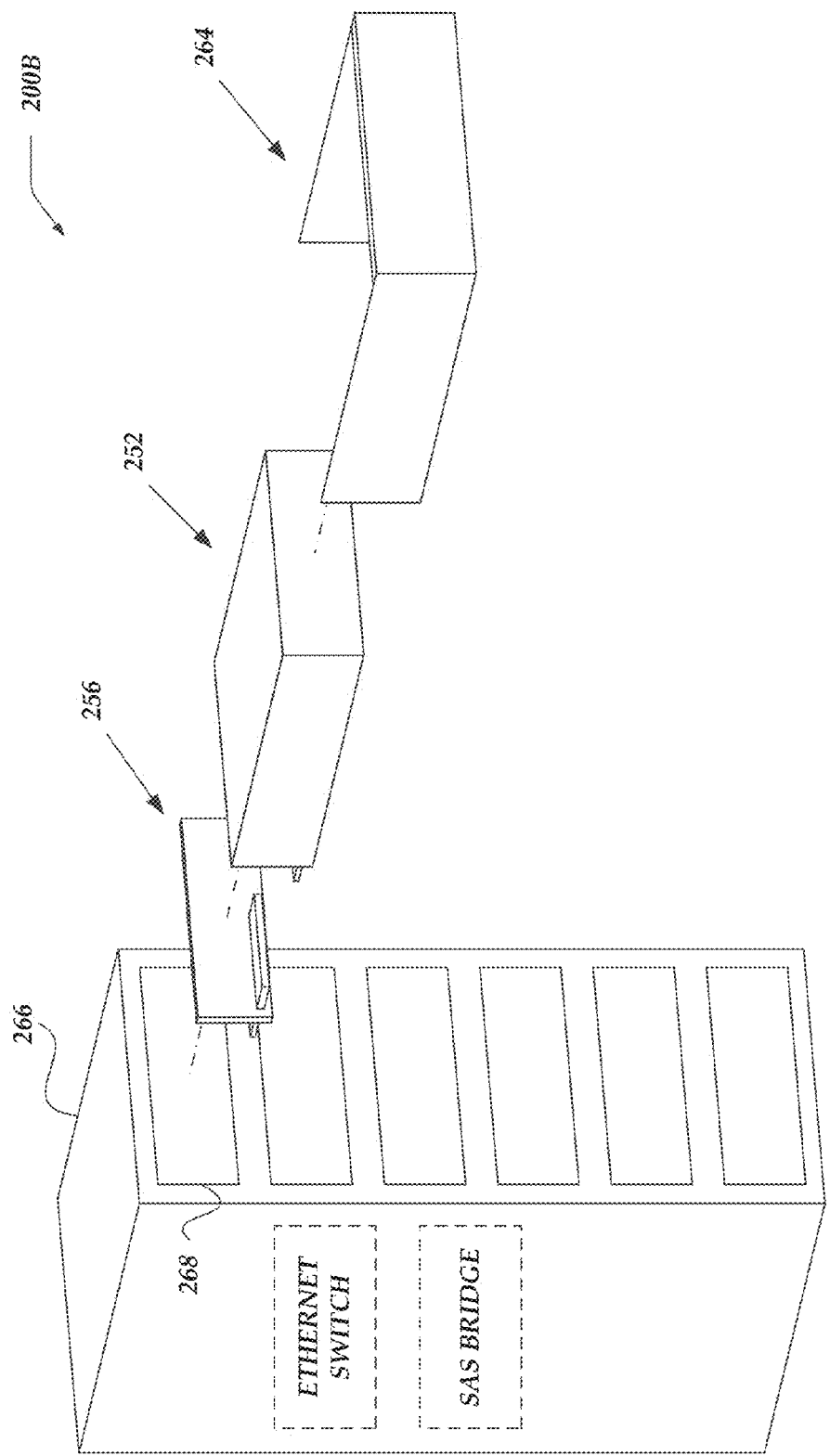
FIG. 2B shows an embodiment of an exploded perspective view of a multi-storage-device chassis that may be included in a system such as that shown in FIG. 1.

FIG. 2B shows an embodiment of an exploded perspective view of a multi-storage-device chassis that may be included in a system such as that shown in FIG. 1. System 200B may include multi-storage-device chassis 266 and storage-device carrier 264. In various embodiments, multi-storage-device chassis 266 may be an embodiment of multi-storage-device chassis 110 of FIG. 1. Multi-storage-device chassis 266 may be an example of a JBOD or other chassis that can support a plurality of storage drives. In some embodiments, storage-device carrier 264 may be configured and arranged to provide proper alignment of storage device 252 with a backplane of multi-storage-device chassis 266.

In various embodiments, controller 256 may be embodiment of controller 114 of FIG. 1. Controller 256 may be coupled to a back of storage device 252. This combination of devices may be fastened to storage-device carrier 264. The combined carrier 264, device 252, and controller 256 may be inserted into slot 268 of chassis 266 in accordance with use instructions of chassis 266 for inserting a carrier into slot 268. As described herein, controller 256 may enable a remote network computer to individually access its correspondingly connected storage device 252. Similarly, controller 256 may communicate with other controllers to coordinate reads and/or writes of data among a plurality of storage devices. In at least one of various embodiments, controller 256 may be enabled to control power provided to storage device 252 such that storage device 252 can be powered down when removed or not in a shingle, powered up when added to a shingle, powered up to fulfill a read request and power down after completion of the read request, or the like.

In various embodiments, multi-storage-device chassis 266 may include an Ethernet switch and a storage-drive-data bridge (e.g., a SAS bridge). In various embodiments, the Ethernet switch may provide access between controllers and/or from the chassis to other networks, and the storage-drive-data bridge may provide direct data access to a network computer without utilizing the Ethernet switch.

Shingling Overview

FIGS. 3-7 show various illustrative embodiments of shingles and the modification of shingles among a group of storage devices. Embodiments described herein may be described generically as data being written to a storage system without reference to the device requesting and/or otherwise coordinating the writes, but noting that a network computer (e.g., server computer 200 of FIG. 2A) and/or controllers (e.g., controllers 114 of FIG. 1) may coordinate and/or manage shingle shifting, writing data to a shingle, reading data from the storage system, or the like. In some embodiments, the storage devices included in the storage system may be part of or separate from the server computer and/or client computer.

Figure 3:
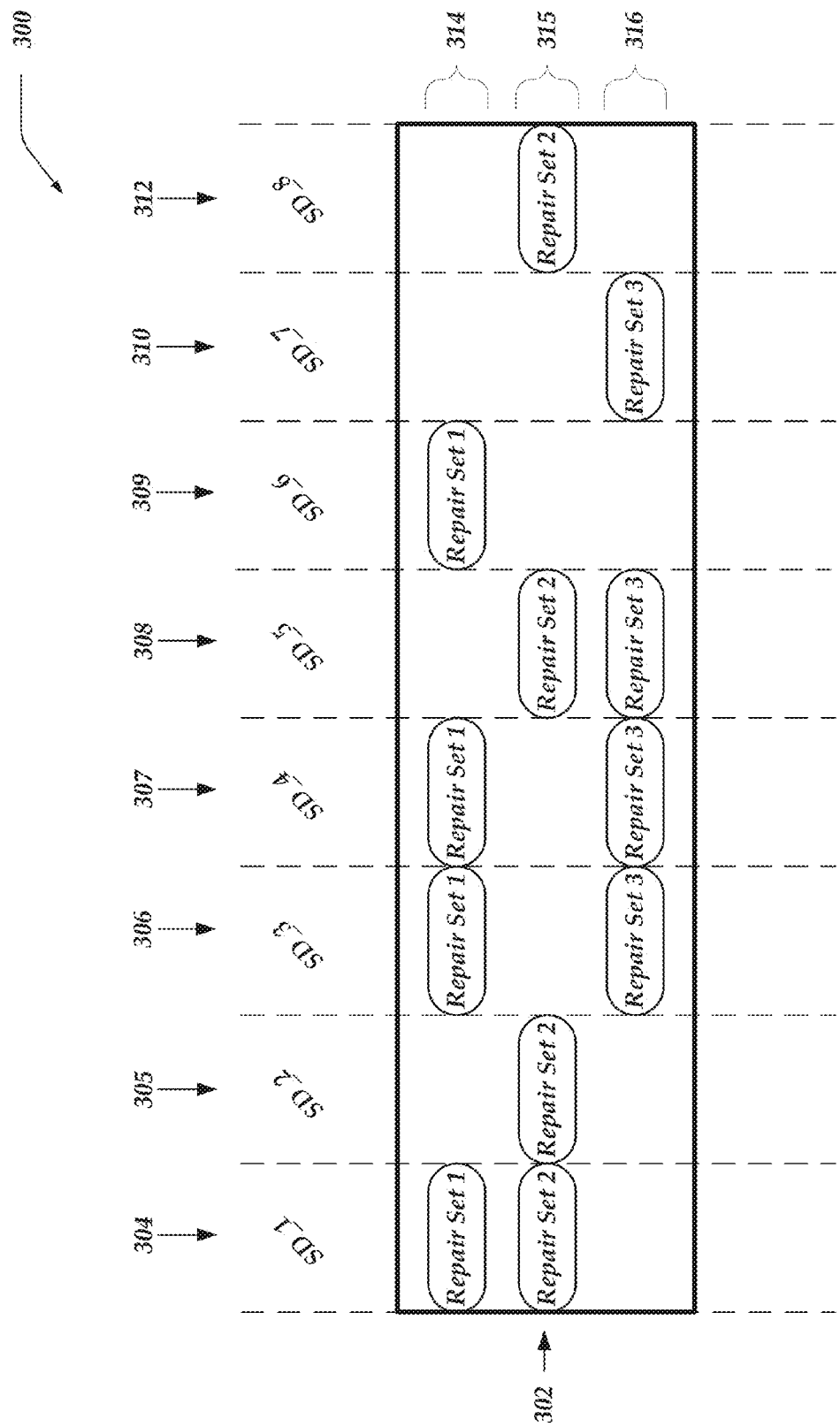
FIG. 3 shows an illustrative embodiment of a shingle of storage devices, where a plurality of data repair sets are written to the shingle storage devices.

Example 300 of FIG. 3 illustrates a single shingle, shingle 302. Shingle 302 may include a plurality of storage devices, such as storage devices 304-312. These storage devices may be a subgroup of a larger group of plurality of storage devices, such as illustrated in FIGS. 4-7. This larger group of storage devices may generally be referred to as a storage system. It should be understood that a shingle may include more or less storage devices than what is illustrated.

As write requests are received by the storage system, repair sets (e.g., repair sets 314-316) may be generated for writing data to the storage system. In some embodiments, each separate repair set may be for each separate write request. In other embodiments, each separate repair set may be for a plurality of write requests. In some embodiments, a repair set may include a plurality of logical blocks, where some repair-set blocks include data (i.e., data blocks) and one or more repair-set blocks include parity or repair information (i.e., repair block(s)). In various embodiments, the number of repair blocks may be determined based on the protection level of the storage system so that if at least one storage device is lost, the data from that storage device can be rebuilt from data on other storage devices.

Each block of a repair set may be written to a different storage device in shingle 302. The storage devices to write a repair set to may be randomly selected, semi-randomly selected, selected in a determined order, or selected based on predetermined storage system writing policies (e.g., based on amount of available storage space of a particular storage device, frequency of reads to a storage device, or the like). For purposes of illustration described herein, the storage devices in a shingle for writing a repair sent may be randomly selected from the storage devices in the shingle. For example, repair set 314 may be written to storage devices 304, 306, 307, and 309; repair set 315 may be written to storage devices 304, 305, 308, and 312; and repair set 316 may be written to storage devices 306, 307, 308, and 310. It should be noted that the data blocks or repair blocks of a repair set may be written to any of the storage devices selected for that repair set, even though FIG. 3 does not distinguish between data blocks and repair blocks).

As described herein, the shingle (e.g., shingle 302) may be modified and/or shift to remove at least one storage from the shingle and/or to include at least one new storage device in the shingle. This modification/shifting is illustrated in FIG. 4.

Figure 4:
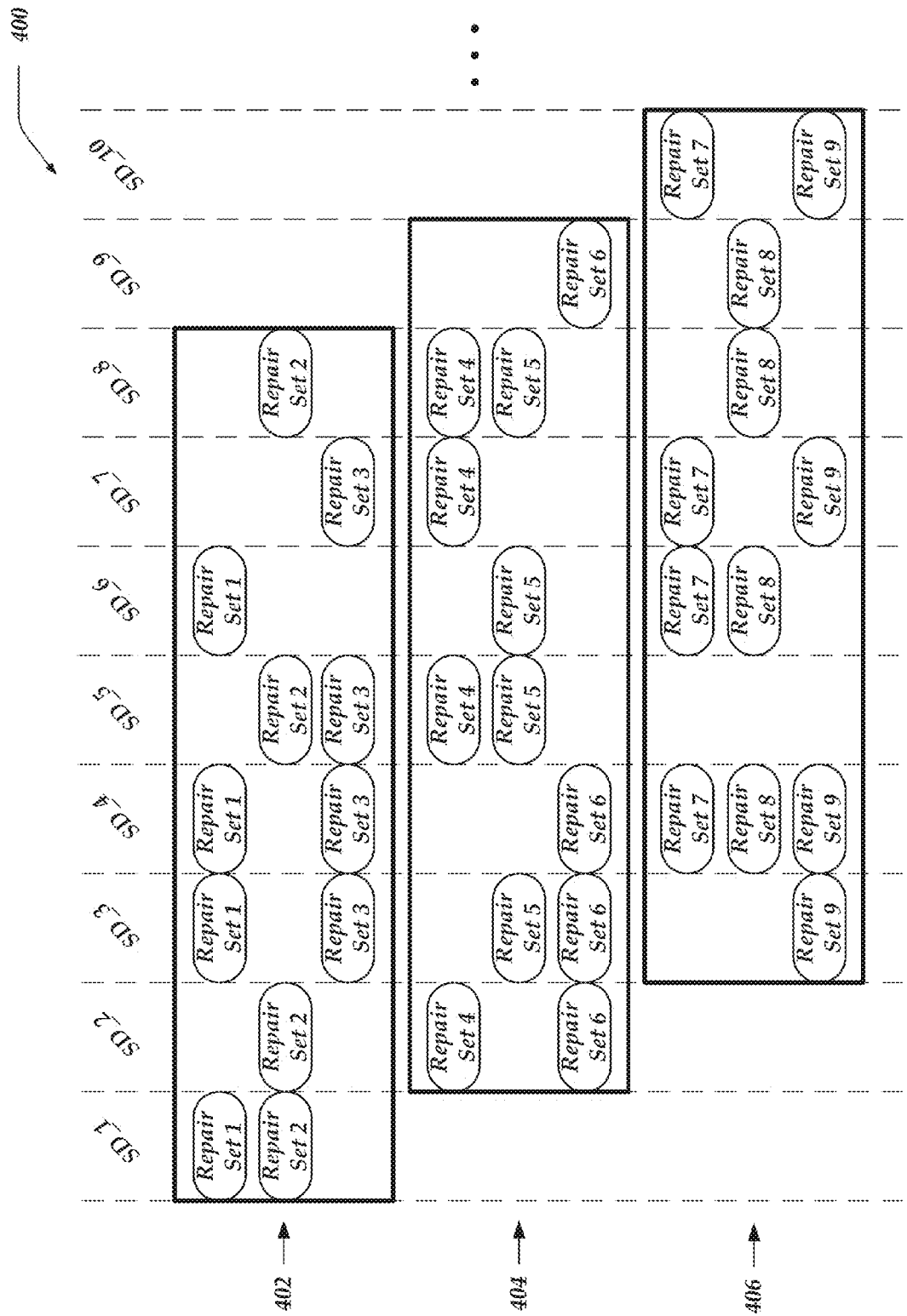
FIG. 4 shows an illustrative embodiment of a plurality of shingles for different data repair sets.

Example 400 of FIG. 4 illustrates three shingles, shingles 402, 404, and 406. Shingle 402 may include storage devices 1-8 (i.e., SD_1 through SD_8). Similar to FIG. 3, as write requests are received, the data may be saved to a subset of the storage devices in a shingle by use of repair sets. As illustrated, repair sets 1, 2, and 3 may be written to the storage devices in shingle 402. At some determined point in time (described below), shingle 402 may shift to shingle 404 and include at least one different storage device than shingle 402. Once shifted, write requests may be written to the storage devices in shingle 404 (i.e., the shifted/modified shingle). So repair sets 4, 5, and 6 may be written to storage devices 2-9. Again, at some determined point in time, shingle 404 may shift to shingle 406. And data may be written to storage devices 3-10 via repair sets 7, 8, and 9. It should be recognized that the number of repair sets in a shingle may differ than what is illustrated. Additionally, the number of repair sets in on shingle may be the same or different than the number of repair sets in a different shingle. In some embodiments, the number of repair sets in a shingle may be based on the size of the blocks in a repair set, the number of storage devices in a shingle, the number of blocks per repair set, the capacity of the storage devices in a shingle, or the like.

It should be recognized that once the shingle has shifted, new repair sets are used for that shifted shingle, even though some of the storage devices are the same in each shingle. In this illustration, storage device 1 may include a block from repair sets 1 and 2 (from shingle 402), storage device 2 may include a block from repair sets 2, 5, and 6 (from shingles 402 and 404); storage device 3 may include a block from repair sets 1, 3, 5, 6, and 9 (from shingles 402, 404, and 406); storage device 4 may include blocks from repair sets 1, 3, 6, 7, 8, and 9 (from shingles 402, 404, and 406); and so on. It should be noted that the blocks for a given repair set may be data blocks or repair blocks for that given repair set.

In various embodiments, repair sets may not be utilized with shingling, but rather data may be stored at one or more of the storage devices in a shingle. Even without repair sets, shingles may still shift to include a different composition or logically organized sub-group of storage devices than the composition or logically organized subgroup of the pre-shifted shingle.

The point in time for shifting or otherwise modifying a shingle may be based on one or more storage system conditions, policies, or parameters. In some embodiments, the shingle may shift based on a frequency of reads and/or writes, size of previous or incoming writes, time between shingle shifts, storage capacity (of the shingle or one or more storage devices), or the like.

In some embodiments, each shingle may have a capacity that is determined based on the number of storage devices in the shingle and/or the capacity of the storage devices. In other embodiments, the shingle may be shifted at predetermined time periods, such as every 24 hours. In yet other embodiments, the shingle may be shifted if a storage device is above a threshold capacity, which may allow that storage device to be removed from the shingle. In some other embodiments, the shingle may be shifted if the number of read requests for data on a storage device is below a threshold value, which may allow that storage device to be removed from the shingle. Since this storage device is receiving relatively low number of read requests, then it may be beneficial to power down that storage device. So, by shifting the shingle to remove the low read-volume storage device from the shingle, that storage device may be powered down. It should be recognized that the criteria for when to shift the shingle may be based on one or a combination of different storage system policies or parameters.

In one non-limiting, non-exhaustive example, assume there are eight storage devices in a shingle, then the shingle capacity may be $\frac{1}{8}^{th}$ of the capacity of the storage devices. Therefore, when enough data is written to fill $\frac{1}{8}^{th}$ of each storage device in the shingle, then the shingle may shift. In this way, by the time the last storage device in the shingle (e.g., storage device 8) is written to and removed from the shingle, then that storage device may be filled to capacity or within some tolerance threshold value of full capacity.

In various embodiments, after a storage device is removed from a shingle it may be powered down. In some embodiments, the removed storage device may be automatically powered down. In other embodiments, the removed storage device may be powered down if an activity level (e.g., a rate of data reads) of the drive falls below a predetermined threshold. However, embodiments are not so limited and other criteria may be employed for determining when to power down a removed storage device.

Figure 5:
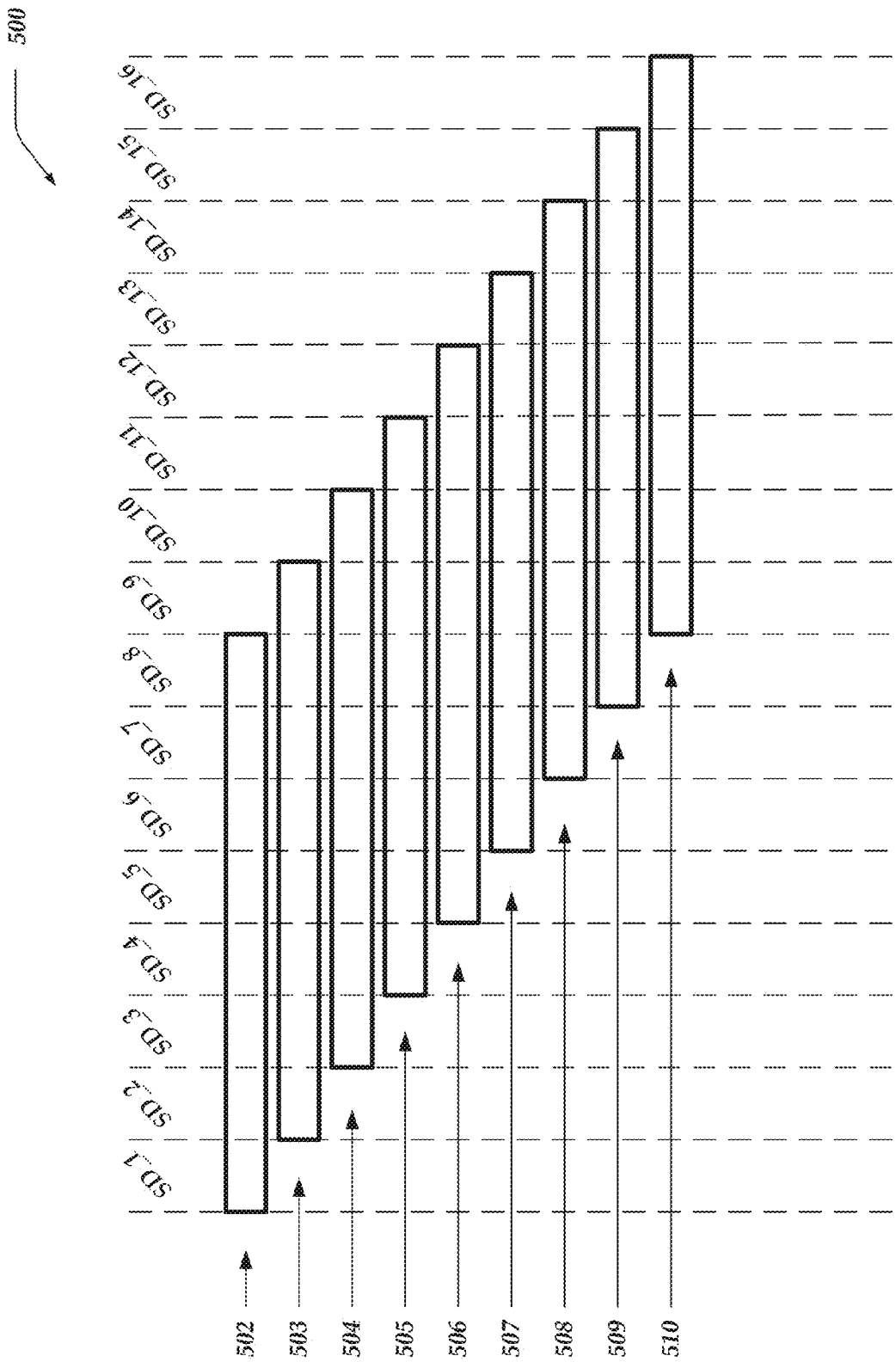
FIG. 5 shows an illustrative embodiment of modifying shingles among a group of storage devices.

As described herein, the shingle may be a subgroup of a larger group of storage devices. Example, 500 of FIG. 5 illustrates the shifting of shingles among a group of storage devices. In some embodiments, the group of storage devices may be storage devices in a rack or chassis of storage devices, storage devices in a data center, or the like. Virtually any logical or physical grouping of storage devices may be a group of storage devices that can employ shingle modification or shifting in accordance with embodiments described herein.

In this illustration, data writes may begin with shingle 502, similar to that which is described above in conjunction with FIGS. 3 and 4. At some point, shingle 502 may shift to shingle 503, such that the composition of storage devices in shingle 503 may be different than shingle 502. Shingles 503-510 may continue to shift until shingle 510 includes storage devices 9-16.

Figure 6:
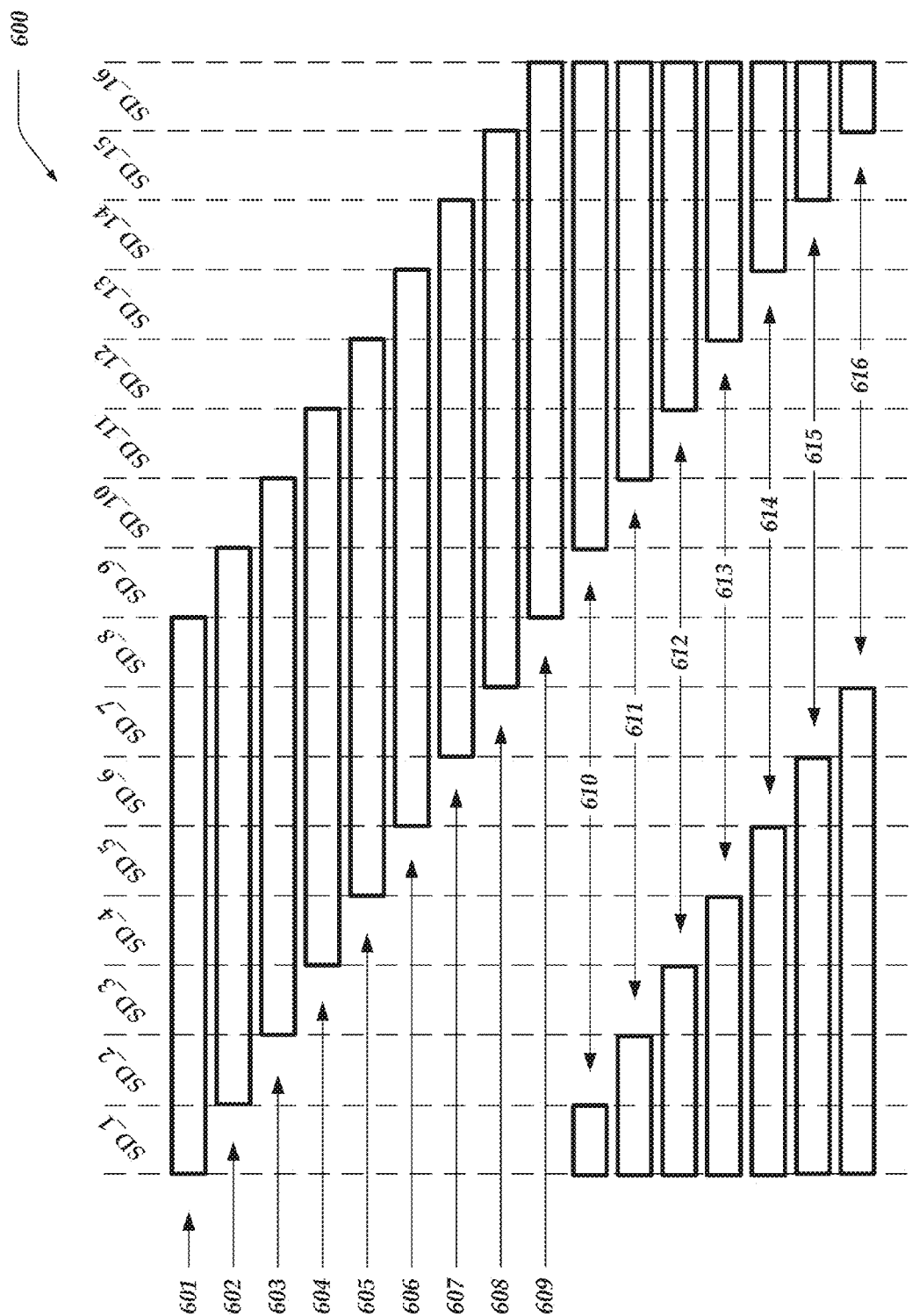
FIG. 6 shows an illustrative embodiment of shifting shingles among a group of storage devices with wraparound shingles.
Figure 7:
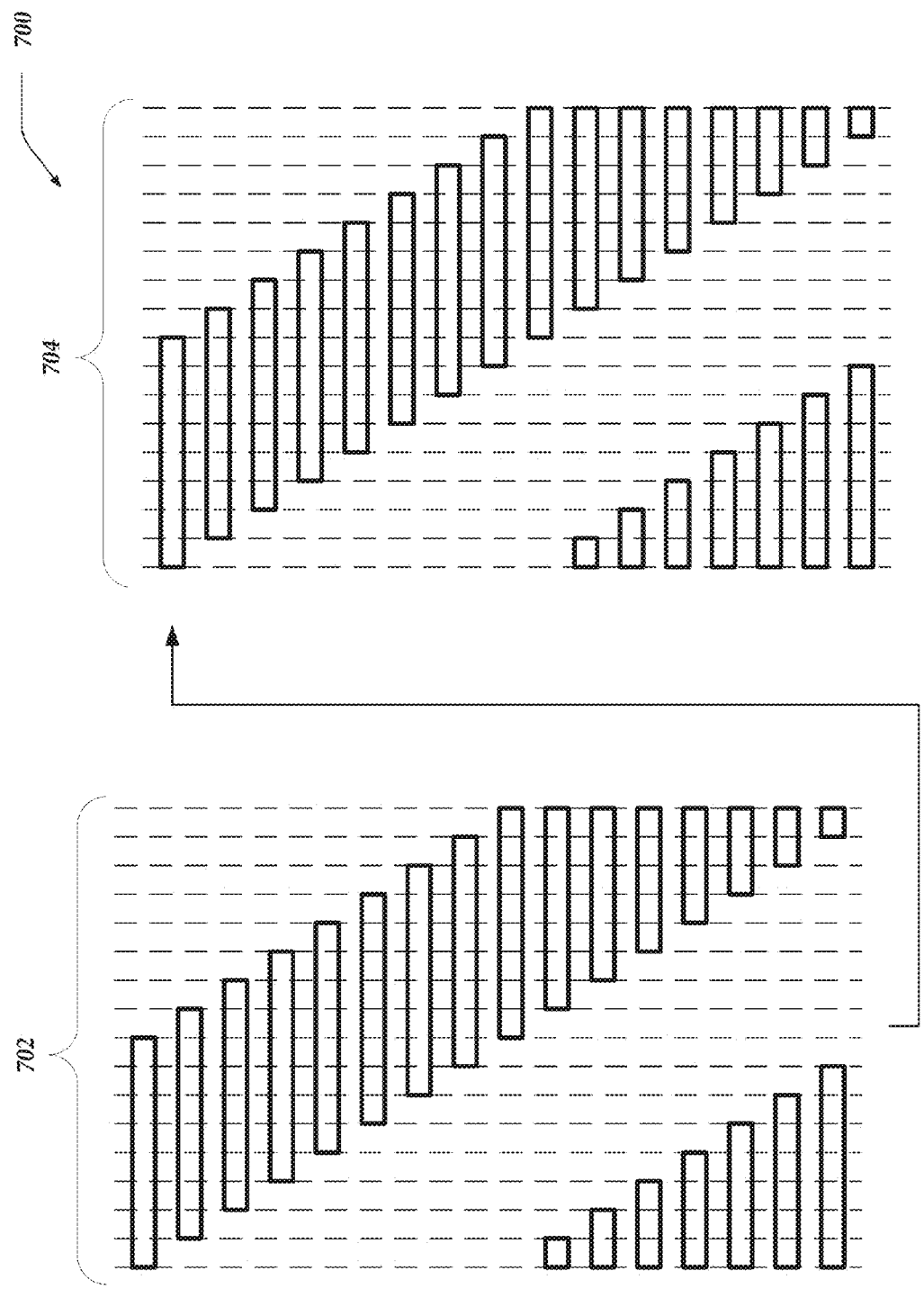
FIG. 7 shows an illustrative embodiment of shifting shingles among a plurality of groups of storage devices.

In some embodiments, once the last storage device in the group (e.g., storage device 16) is included in a shingle, and the shingle is to be shifted, then the shingle may wrap around to storage device 1 (e.g., as illustrated in FIG. 6), or another group of storage devices may be employed (e.g., as illustrated in FIG. 7, but noting that FIG. 7 employs both wrap around shingle and a new group of storage devices).

Example 600 in FIG. 6 illustrates shingles that shift and ultimately wrap around to previously removed storage devices. Shingles 601-609 may shift similar to that described above for shingles 502-510 of FIG. 5. Shingle 609 may shift to shingle 610 to include previously removed storage device_1. Shingles 610-616 may continue to shift in accordance with embodiments described herein. This wraparound construct is described in more detail below in conjunction with FIG. 9.

In various embodiments, shingles may shift until a capacity condition is satisfied. Once the capacity condition is satisfied, a new group of storage devices may be employed with continued shingling in the new group, which is illustrated by example 700 in FIG. 7. In this example, group 702 may include a plurality of storage devices, such as a rack of storage devices. Shingles may shift in group 702 similar to what is illustrated in FIG. 6. When a capacity condition is satisfied, new group 704 may be employed to continue shingle shifting. New group 704 may include a plurality of storage devices that were not included in group 702, such as a separate rack of storage devices. Singles may shift in new group 704 similar to what is illustrated in FIG. 6. Although only two groups of storage devices is illustrated more groups of storage devices of varying number of storage devices may be employed when a capacity condition for a group is satisfied. Employment of a new group of storage devices is described in more detail below in conjunction with FIG. 10.

FIGS. 3-7 illustrate shifting shingles among an ordered group of storage devices. However, embodiments are not so limited and a shingle may be modified to remove any one or more of the storage devices in the shingle and/or add one or more other storage devices in the group to the shingle. So, for example, after shingle 510 in FIG. 5, a next shingle may include storage devices 11-16, 4, and 7. Accordingly, various combinations of shingle modifications may occur from one shingle to another. For example, modifying one shingle to a second shingle may include adding three storage devices and removing one storage device from the shingle. But modifying the second shingle to a third shingle may include removing four storage devices and adding two storage devices to the shingle. And so on.

General Operation

The operation of certain aspects of the invention will now be described with respect to FIGS. 8-10. In at least one of various embodiments, processes 800, 900, or 1000 of FIGS. 8-10, respectively, may be implemented by and/or executed on one or more computers, such as network computer 200 of FIG. 2A or other network device, such as one or more controllers 114 of FIG. 1. Additionally, various embodiments described herein can be implemented in a system such as system 100 of FIG. 1.

Figure 8:
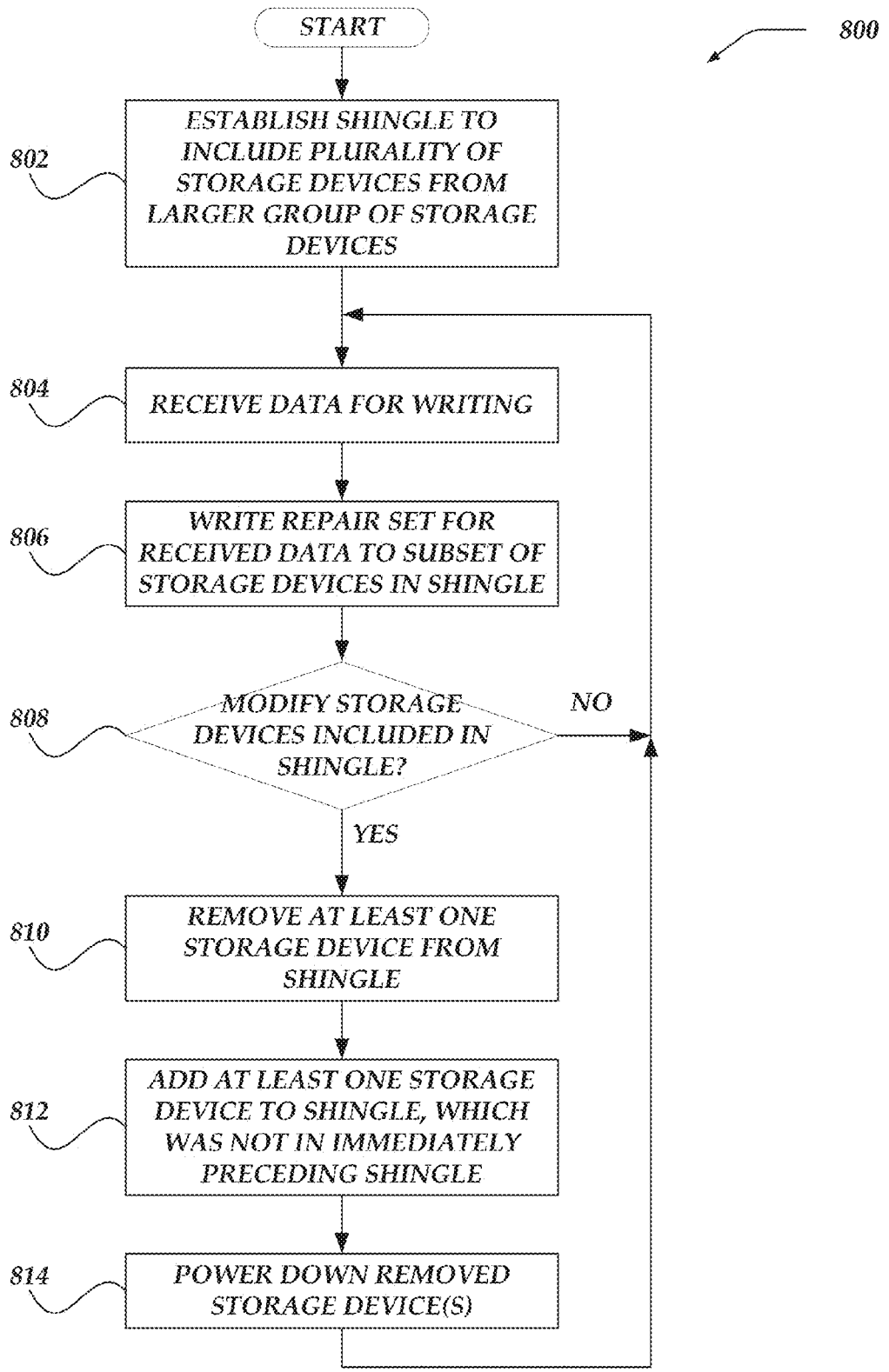
FIG. 8 illustrates a logical flow diagram generally showing one embodiment of an overview process for modifying a shingle among a group of storage devices.

FIG. 8 illustrates a logical flow diagram generally showing one embodiment of an overview process for modifying a shingle among a group of storage devices. Process 800 may begin, after a start block, at block 802, where a shingle may be established. The shingle may include a plurality of storage devices that are from a larger group of a plurality of storage devices. In various embodiments, the shingle may be a subgroup and may include a fewer number of storage devices than a number of storage devices in the larger group.

In some embodiments, the group of storage device may be a plurality of storage device that may be referred to as a storage system. The storage system may include one or more racks or chassis of storage devices, storage devices in one or more datacenters, or a plurality of storage devices that are otherwise capable of performing collaborative reading/writing of data.

In at least one of various embodiments, the shingle may be a current set of storage devices that can be utilized for writing data, even if other devices are available for reading, but are not in the shingle. It should be noted that in various embodiments data may be read (or even deleted) from storage devices in the group regardless of the shingle status (i.e., whether the storage device is in or out of the shingle). But that only storage devices in the shingle may be written to.

Process 800 may proceed to block 804, where data for writing may be received. In various embodiments, a network computer (e.g., a server computer, client computer, or the like) may receive a write request for writing data to the group of storage devices (e.g., the storage system). For example, a server computer may receive a write request from a client device.

The network computer may coordinate write requests among the storage devices in the shingle. In other embodiments, the network computer may provide the write request to a controller that is connected to a storage device in the group of storage devices. In at least one of various embodiments, the controller may coordinate the write request with other controllers connected to other storage devices in the group of storage devices.

Process 800 may continue to block 806, where a repair set for the received data may be written to a subset of the storage devices in the shingle. In some embodiments, the repair set may include a plurality of logical blocks, with some of the blocks being data blocks and at least one of the blocks being a parity or repair block. Each block may be written to a different storage device in the shingle. In some embodiments, each separate write request may correspond to a separate repair set. In other embodiments, a plurality of write requests may be associated with a single repair set. Embodiments are not so limited, however, and it should be noted that in some embodiments, the received data may be written among the storage devices in the shingle without the use of repair sets.

Process 800 may proceed next at decision block 808, where a determination may be made whether the storage devices that are included in the shingle are to be modified. In various embodiments, this determination may be to determine if a shingle-modification condition has been satisfied. So, this determination may be to determine if one or more storage devices may be added to the shingle and/or if one or more storage devices may be removed from the shingle. In some embodiments, modifying the shingle may include shifting the shingle among an ordered set of storage devices, such as described in further detail below in conjunction with FIG. 9.

In various embodiments, the determination of when to modify a shingle may be static or dynamic. For example, in some embodiments, the shingle-modification determination may be static such that each shingle modification occurs as a result of a same storage system condition, policy, or parameter being satisfied. In other embodiments, the shingle-modification determination may be dynamic such that one or more storage system conditions, policies, or parameters and a current status of the storage system and/or shingle may be employed to determine when to modify a current shingle. So in some embodiments, the determination of when to modify one shingle may be based on same or different criteria than when to modify a different shingle.

Examples of storage system conditions, policies, or parameters defining when a shingle modification may occur may include but are not limited an average used capacity of the storage devices in the shingle, a time period (e.g., every day), a maximum used capacity of one of the storage devices in the shingle, an amount of incoming read and/or write traffic, a used capacity of the shingle, or the like.

For example, if there are a lot of read requests being received (e.g., above a threshold number in a given timeframe) for the devices in the shingle, then the shingle may not be modified. In another example, if there are a lot of write requests being received (e.g., above a threshold number in a given timeframe) then the shingle may be modified.

In another example, if a shingle capacity has been reached, then the shingle may be modified. In some embodiments, the shingle capacity may be equal to the average, minimum, or maximum capacity of the storage devices in the shingle. For example, assume each storage device in a shingle has a capacity of one terabyte, then the shingle may have a capacity of one terabyte, such that when one terabyte of data is written to the storage devices in the shingle, then the shingle may be modify to change to composition of the storage devices in the shingle.

In other embodiments, the shingle capacity may be based on the number of storage devices in the shingle. For example, the shingle capacity may be $1/n^{th}$ of the average, minimum, or maximum capacity of a storage devices in the shingle, where n is the number of storage devices in the shingle, such that the shingle may be modified if the shingle capacity is achieved for a single storage device in the shingle. For example, assume again that the storage devices have a capacity of one terabyte and assume there are eight storage devices in the shingle. The shingle may be modified if 125 Gigabytes are written to any individual storage device in the shingle. Once the shingle is modified, then another 125 Gigabytes of data can be written to one of the storage devices in the modified shingle before it is again modified. In this way, storage devices fill in a cascading fashion as the shingle is modified among the storage devices in the group.

If the shingle may be modified (i.e., shingle-modification condition being satisfied), then process 800 may flow to block 810; otherwise, process 800 may loop to block 804 to perform additional write requests or perform other actions (not illustrated), such as fulfill read requests, perform data recovery due to a failed storage device, or the like.

At block 810, at least one storage device may be removed from the shingle. In some embodiments, selecting which storages devices to remove from the shingle may be predetermined or selected based on one or more shingle-modification criteria. This shingle-modification criteria may be based on one or more storage system conditions, policies, or parameters, similar to determining when to modify a shingle. So, the number of storage devices to remove from the shingle may be static and predetermined or dynamically modified each time the shingle is modified.

For example, in some embodiments, it may be predetermined that each time the shingle is modified, then an oldest, lowest ordered, tail or other storage device may be removed from the shingle. In various embodiments, the oldest storage device in a shingle may be a storage device that has been in the shingle the longest (e.g., longest time frame, highest number of shingle modifications, or the like). In some embodiments, the system may maintain a counter for each storage device indicating how many different shingles each storage device has been included in consecutively.

In various other embodiments, the group of storage devices may be ordered, such as 1–n. In at least one embodiment, one or more of the lowest ordered storage device in the current shingle may be removed from the shingle, such as illustrated in FIG. 5. In some other embodiments, the shingle may have a head and a tail storage device. In at least one of the various embodiments, one or more of the storage devices at the tail may be removed from the shingle, such as described in more detail below in conjunction with FIG. 9 and illustrated in FIGS. 6 and 7.

In some other embodiments, the number of storage devices and which storage devices to remove from a shingle may be dynamic based on a variety of shingle-modification criteria. For example, as described above, one possible condition for determining when to modify a shingle may be if a threshold amount of data is written to a storage device in the shingle (e.g., $1/n^{th}$ of the storage device is filled while in the shingle, where n is the number of storage devices in the shingle). In this example, the storage device that satisfies the threshold capacity amount may be removed from the shingle. However, embodiments are not so limited, and other shingle-modification criteria and/or combinations of criteria may be employed. In another non-limiting example, if a storage device is performing read requests below a predetermined rate, then that storage device may be removed from the shingle.

Once removed from the shingle, future data writes may not be performed by the removed storage device. That is, unless the storage device is later re-added to the shingle as described herein. In various embodiments, read requests may still be handled by the removed storage device.

In any event, process 800 may continue at block 812, where one or more storage devices may be added to the shingle. The storage devices to add to the shingle may be storage devices that were not in the pre-modified (i.e., immediately preceding shingle). Similar to removing storage devices from a shingle, determining which storage devices to add to the shingle may be based on shingle-modification criteria that may be based on one or more storage system conditions, policies, or parameters. So, the number of storage devices to add to the shingle may be static and predetermined or dynamically modified each time the shingle is modified.

For example, in some embodiments, it may be predetermined that each time the shingle is modified, then next ordered storage device may be added to the shingle. As described herein, the group of storage devices may be ordered, such as 1–n. In at least one embodiment, one or more of the next highest ordered storage device compared to the highest ordered storage device in the current shingle may be added to the shingle, such as illustrated in FIG. 5.

In some other embodiments, storage devices that were previously removed from the shingle (i.e., removed prior to the immediately preceding or pre-modified shingle) may be added to the shingle. In at least one embodiment, this re-adding of storage devices to the shingle may involve wrapping the shingle as described in more detail below in conjunction with FIG. 9 and illustrated in FIGS. 6 and 7. However, other removed storage devices in a non-ordered system may be re-added to the shingle.

In other embodiments, a current system status may be employed to determine which storage device or how many storage devices to add to the shingle. For example, if a rate or size of the incoming write requests is above or below a threshold value, then more or fewer storage devices may be added to the shingle. Similarly, of the protection level of the storage system is changed (e.g., from protecting against one device failure to two device failures), then the number of storage devices in the shingle may be modified. For example, a higher number of storage devices (than previous shingle modifications) may be added to account for an increased protection level. In contrast, fewer storage devices (than previous shingle modifications) may be added to account for a decreased protection level.

It should be noting that in some embodiments no storage devices may be removed from the shingle so long as one or more storage devices are added to the shingle. Similarly, in other embodiments, no storage devices may be added to the shingle so long as one or more storage devices are removed from the shingle. In any event, the modified or new shingle may include or have a different composition of storage devices than the pre-modified or immediately preceding shingle.

Process 800 may proceed to block 814, where one or more of the removed storage devices may be powered down. Since powered-on storage devices that perform few actions (e.g., reads or write) still utilize electricity and cooling, power and money may be wasted keeping these non-performing devices turned on. This type of problem can typically occur in "cold" or archival storage systems where data writes are much more common than data reads. Similarly, powered-on devices can be more susceptible to power surges or other device failure issues than non-powered-on devices. Since storage devices that are removed from the shingle no longer handle write requests, the removed storage devices may be powered down to save electricity and money, and potentially reduce to probability of failures and data loss.

In various embodiments, storage devices not included in the shingle may be powered down until they are added or re-added to a shingle. In some embodiments, a powered-down storage device may be powered up to handle a read request. In other embodiments, the powered-on storage-devices may provide a de-graded read for the read request as if the powered-down storage device has failed. For example, if a read request is for data that includes a repair set block on a powered-down storage device, then that repair set block may be reconstructed from other corresponding repair set blocks on other, powered-up storage devices. However, if there are not enough powered-on storage devices to provide a degraded read, then the powered-down storage device may be temporarily powered up to perform the read request. Once completed, the storage device may immediately re-power-down or may wait a predetermined to time re-power-down to account for multiple read requests in a short timeframe.

As described herein, each separate storage device may be connected to separate corresponding controllers that may coordinate read and/or write requests. In various embodiments, each controller may also manage the power provided to the corresponding storage device. So, a controller that is connected to a storage device that is removed from a shingle may reduce or otherwise power-down its corresponding storage device. However, embodiments are not so limited and other mechanisms may be employed for powering down storage devices removed from the shingle. For example, a backplane of a multi-storage-device chassis may be modified to include the capabilities to individually power up or power down each storage device in the multi-storage-device chassis.

After block 814, process 800 may loop to block 804 to continue to write data to the storage devices in the modified shingle.

Figure 9:
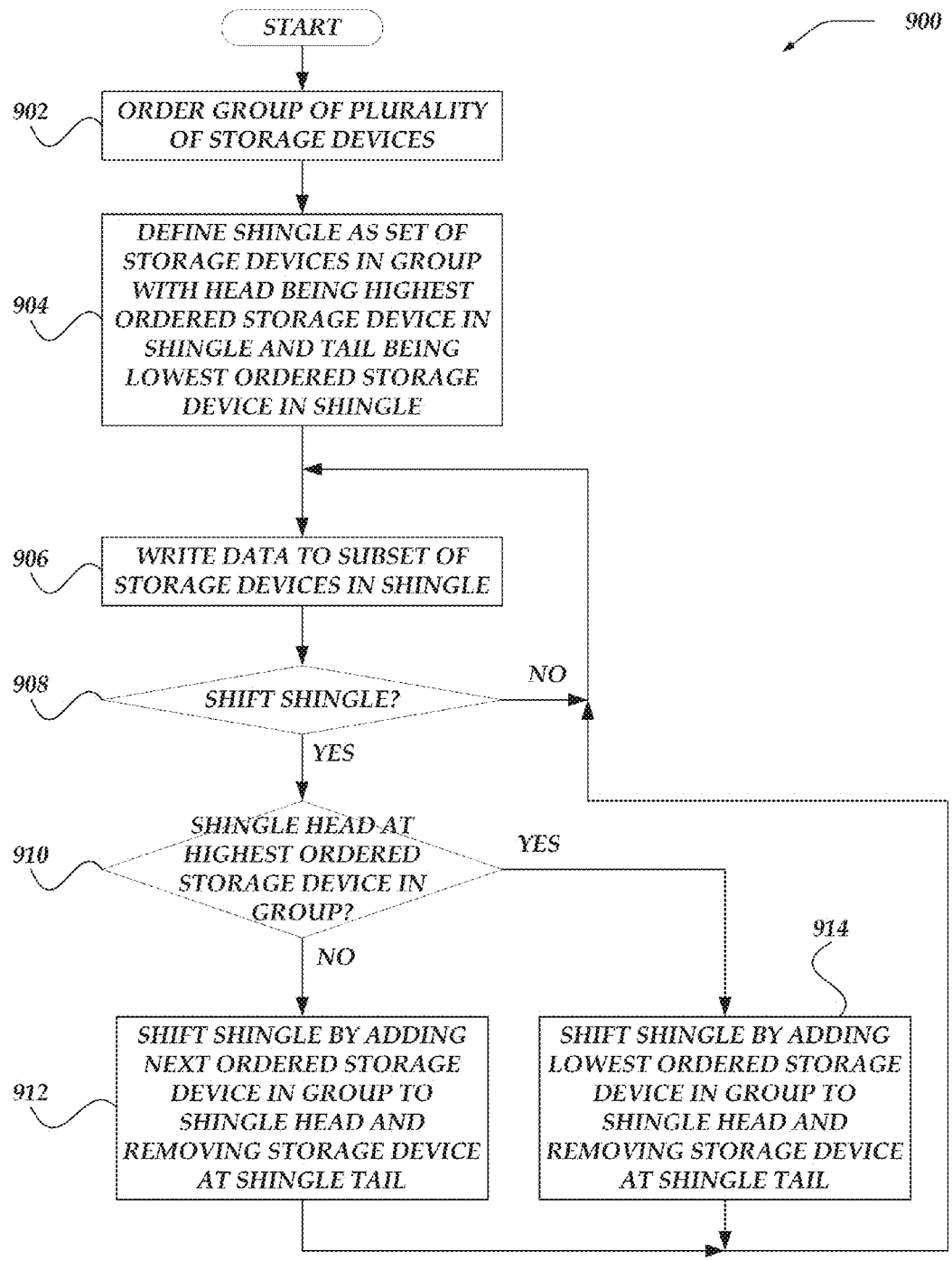
FIG. 9 illustrates a logical flow diagram generally showing one embodiment of a process for shifting a shingle among a group of ordered storage devices with wraparound shingles.

FIG. 9 illustrates a logical flow diagram generally showing one embodiment of a process for shifting a shingle among a group of ordered storage devices with wraparound shingles. Process 900 may begin, after a start block, at block 902, where a group of storage devices may be ordered. In various embodiments, a plurality of storage devices in a group may be ordered from a lowest ordered storage device (e.g., "storage device 1") to a highest ordered storage device (e.g., "storage device n," where n is the number of storage devices in the group). In some embodiments, the group of storage devices may be the storage devices in one or more multi-storage-device chassis or racks. In at least one embodiment, the ordering may be based on the slots in the chassis or rack. However, embodiments are not so limited and each storage device may be provided an ordered position as it is powered on or otherwise recognized by the system.

In various embodiments, the exact ordering of the storage devices may be immaterial, but that the order may go unchanged so that the shingle may shift and wraparound as illustrated in FIG. 6 and as described herein. In various other embodiments, the ordering of the group of storage devices may be employed to shift the shingle without wrapping the shingle back to the lowest ordered storage devices, such as illustrated in FIG. 5.

In any event, process 900 may proceed to block 904, where a shingle may be defined as a set of storage devices in the group. As described herein, the shingle may include a number of storage devices that is smaller than the number of storage devices in the group.

In at least one of various embodiments, the shingle may include a head and a tail. The head may be a highest ordered storage device in the shingle and the tail may be a lowest ordered storage device in the shingle. In some embodiments, the shingle may be initially defined such that the tail of the shingle is the lowest ordered storage device in the larger group of storage devices. For example, in FIG. 6, shingle 601 may be an initial shingle with a head of storage device_8 and a tail of storage device_1. In various embodiments, the shingle may be thought of as a FIFO queue, where the tail storage device is first in the queue and the head storage device is last in the queue. In this analogy, storage devices may be removed from the tail (first out) and storage devices may be added to the head.

In any event, process 900 may continue at block 906, where data may be written to a subset of the storage devices in the shingle. In at least one of various embodiments, block 906 may employ embodiments of blocks 804 and/or 806 of FIG. 8 to write data to the storage devices in the shingle.

Process 900 may proceed next to decision block 908, where a determination may be made whether the shingle may be shifted. In various embodiments, decision block 908 may employ embodiments of decision block 808 to determine if the shingle may be modified by shifting the shingle. If the shingle may be shifted (i.e., shingle-modification condition being satisfied), then process 900 may flow to decision block 910; otherwise, process 900 may loop to block 906 to continue to write data to the storage devices in the shingle.

At decision block 910, a determination may be made whether the shingle head is at the highest ordered storage device in the group. This determination may be made based on a comparison of the order of the head storage device in the shingle and the highest ordered storage device in the group. For example, the head storage device of shingle 609 of FIG. 6 may be storage device 16 (and tail storage device may be storage device_9). If the shingle head is at the highest ordered storage device in the group of storage devices, then process 900 may flow to block 914; otherwise process 900 may flow to block 912.

At block 912, the shingle may be shifted by adding the next higher ordered storage devices in the group to the shingle head and removing the storage device at the shingle tail. FIG. 6 illustrates this shingle shifting by shifting from shingle 601 to shingle 602, from shingle 602 to shingle 603, and so on. The storage device that is added to the shingle may become the new head of the shifted shingle, and the next ordered storage device in the shingle to the removed storage device may be the new tail of the shifted shingle.

In various embodiments, the number of storage devices added and/or removed from the shingle may be static or dynamic based on one or more storage system conditions, policies, or parameters, as described herein. So in at least one of various embodiments, block 912 may employ embodiments of blocks 810, 812, and/or 814 to remove one or more storage devices from the shingle, add one or more storage devices to the shingle, and/or to power down one or more of the removed storage devices.

After block 912, process 900 may loop to block 906 to continue to write data to the storage devices in the shifted shingle.

If at decision block 910, the shingle head is at the highest ordered storage device in the group, then process 900 may flow from decision block 910 to block 914. At block 914, the shingle may be shifted by adding the lowest ordered storage device in the group to the shingle and removing the storage device at the tail of the shingle. By adding the lowest ordered storage device in the group to the head of the shingle, the shingle "wraps-around" the order of the storage devices in the group.

As described above, FIG. 6 illustrates this shingle shifting by shifting from shingle 609 to shingle 610. The storage device that is added to the shingle may become the new head of the shifted shingle, and the next ordered storage device in the shingle to the removed storage device may be the new tail of the shifted shingle. So continuing with the illustration in FIG. 6, the head of shingle 609 may be storage device 16 and the tail may be storage device_9. By shifting from shingle 609 to shingle 610, storage device_1 may become the head of shingle 610 and storage device_10 may be the tail. For example, subsequent shingle shifts may be performed at block 912, such that the shingles shift from shingle 610 to shingle 611, from shingle 611 to shingle 612, and so on.

Similar to block 912, the number of storage devices added and/or removed from the shingle may be static or dynamic based on one or more storage system conditions, policies, or parameters, as described herein. So in at least one of various embodiments, block 914 may employ embodiments of blocks 810, 812, and/or 814 to remove one or more storage devices from the shingle, add one or more storage devices to the shingle, and/or to power down one or more of the removed storage devices.

After block 914, process 900 may loop to block 906 to continue to write data to the storage devices in the shifted shingle.

In various embodiments, after the shingle wraps around to the lowest ordered storage device in the group, such as at block 914, shingles may continue to shift at block 912. In some embodiments, shingles may continue to shift until the tail is the highest ordered storage device in the group (e.g., shingle 616 of FIG. 6, which has a tail at storage device_16 and a head at storage deive_7). In at least one such embodiment, the group of storage devices may be considered to be "full" (i.e., capacity condition satisfied) if a shift is determined at decision block 908 for the shingle whose tail is at the highest ordered storage device in the group. In at least one of various embodiments, another group of storage devices may then be employed, which is described in more detail below in conjunction with FIG. 10.

However, embodiments are not so limited. Since users can delete data and some storage devices may fill up at different rates than other storage devices, in some embodiments, shingles may continue to shift until no additional writes may be made to the storage devices in the group. In other embodiments, shingles may no longer shift based on their order, but rather shingles may be modified based on other conditions being satisfied, as described herein, such as, for example, adding a storage device that has the most available storage capacity—rather than adding a next higher ordered storage device.

Similarly, the storage system conditions, policies, and/or parameters for when to modify a shingle and/or how many storage devices to add and/or remove from a shingle may be modified based on the current status of the storage system. For example, a capacity of the shingle may be modified after shingle 616 in FIG. 6, but shingles may continue to shift throughout the group of storage devices.

In some other embodiments, the group of storage devices may be initially unordered at block 902 and the initial set of storage devices in the shingle may be ordered. As storage devices are added to the shingle at block 912, then those storage devices may become ordered, where the added storage device may have a next higher order in the group than the previous head of the shingle. The added storage device may then become the head of the shingle. In at least one such embodiment, decision block 910 may determine if there is another unordered storage device in the group to add to the shingle. Once all storage devices are ordered, i.e., have been added to the shingle, then the shingle may wraparound to the lowest ordered storage device in the group at block 914.

Figure 10:
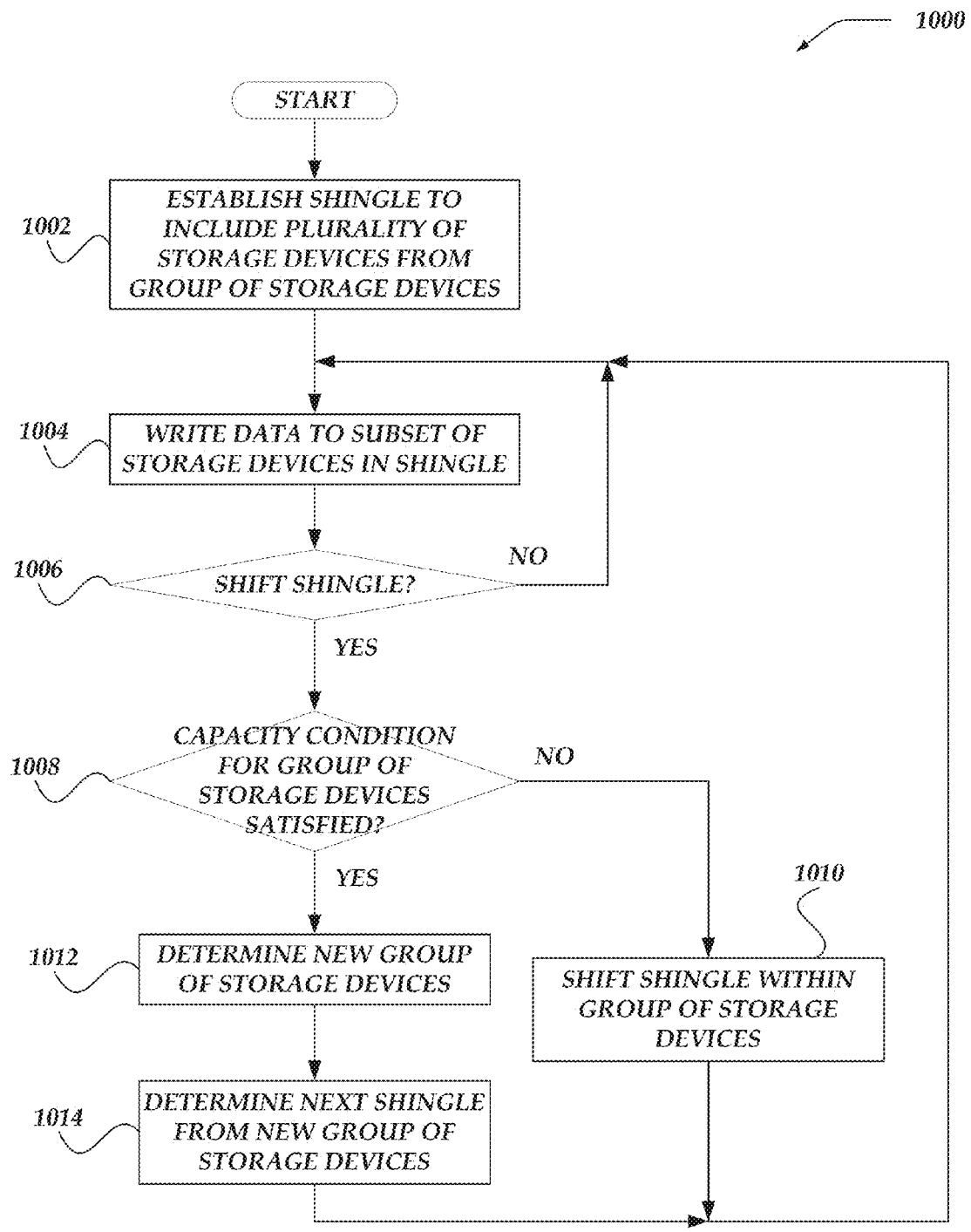
FIG. 10 illustrates a logical flow diagram generally showing one embodiment of a process for shifting shingles among a plurality of groups of storage devices.

FIG. 10 illustrates a logical flow diagram generally showing one embodiment of a process for shifting shingles among a plurality of groups of storage devices. Process 1000 may begin, after a start block, at block 1002, where a shingle may be established to include a plurality of storage devices from a larger group of storage devices. In various embodiments, block 1002 may employ embodiments of block 802 of FIG. 8 and/or blocks 902 and 904 of FIG. 9.

Process 1000 may proceed to block 1004, where data may be written to a subset of the storage devices in the shingle. In at least one of various embodiments, block 1004 may employ embodiments of block 906 to write data to the storage devices in the shingle.

Process 1006 may then proceed to decision block 1006, where a determination may be made whether to shift the shingle. In various embodiments, decision block 1006 may employ embodiments of decision block 908 to determine when to shift a shingle. In some embodiments, decision block 1006 may employ embodiments of decision block 808 of FIG. 8 to determine when to modify which storage devices are included in the shingle—such as if the group of storage devices is unordered. If the shingle may be shifted (or otherwise modified) (i.e., shingle-modification condition being satisfied), then process 1000 may proceed to decision block 1008, otherwise, process 1000 may loop to block 1004 to continue to write data to the storage devices in the shingle.

At decision block 1012, a determination may be made whether a capacity condition for the group of storage devices is satisfied. In some embodiments, the capacity condition may be based on an amount of available storage space remaining in one or more of the storage devices in the group being below a threshold value. So in at least one embodiment, if an average and/or a minimum amount of storage space available in one or more of the storage devices in the group of storage devices is below the threshold, then the capacity condition may be determined to be satisfied. In other embodiments, the capacity condition may be based on an amount of utilized storage space in one or more of the storage devices in the group being above a threshold value. So in at least one embodiment, if an average and/or a maximum amount of storage space available in one or more of the storage devices in the group of storage devices is above the threshold, then the capacity condition may be determined to be satisfied. It should be recognized that a capacity condition may be satisfied based on the capacity of an individual storage device, a portion of the storage devices in the group, or a combination of all storage devices in the group.

In some other embodiments, the capacity condition may be based on a number of shingle modifications and/or shifts that have occurred or a number of times that each storage device has been included in a shingle. For example, in at least one of various embodiments, if a head of the shingle is at a highest ordered storage device in the group of storage devices, then the capacity condition may be satisfied—such as illustrated in FIG. 5. In another embodiment, if a tail of the shingle is at the highest ordered storage device in the group of storage devices, such as after a wraparound, then the capacity condition may be satisfied—such as illustrated in FIGS. 6 and 7. In at least one embodiment, if each storage device in the group has been in a shingle the same number of times as the number of storage devices in the shingle, then the capacity condition may be satisfied. However, embodiments are not so limited and other capacity conditions or combinations of capacity conditions may also be employed.

If a capacity condition is satisfied, then process 1000 may flow to block 1012; otherwise, process 1000 may flow to block 1010. At block 1010, the shingle may be shifted within the group of storage devices. In at least one of various embodiments, block 1010 may employ embodiments of decision block 910, block 912, and block 914 of FIG. 9 to shift the shingle in an ordered group of storage devices. In some embodiments, block 1010 may employ embodiments of blocks 810, 812, and /814 of FIG. 8 to modify which storage devices in the group are included in the shingle (ordered group or unordered group). After block 1010, process 1000 may loop to block 1004 to continue to write data to the storage devices in the shifted/modified shingle.

If, at decision block 1008, the capacity condition for the group is satisfied (e.g., the group is determined to be full), then process 1000 may flow from decision block 1008 to block 1012. At block 1012, a new group of storage devices may be determined. In at least one of various embodiments, the new group of storage devices may be storage devices in a different rack, datacenter, or the like. In at least one of various embodiments, the storage devices in the new group may be different than the storage devices in the previous (full) group, such that a completely different plurality of storage devices is in the new group than the previous group.

Process 1000 may proceed to block 1014, where a next shingle may be determined from the new group of storage devices. In various embodiments, block 1014 may employ embodiments of block 1002 to determine the shingle from the new group. After block 1014, process 1000 may loop to block 1004 to continue to write data to the next shingle in the new group of storage devices. One illustrative example of determining a shingle from a new group and continuing to shift shingles in the new group is illustrated in FIG. 7.

In various embodiments, the previous group of storage devices may be powered down when the next shingle in the new group of storage devices is established. So, in some embodiments, a new rack or chassis of storage devices may be powered up when the new group of storage devices is determined, and the previous rack or chassis (i.e., previous group) may be powered down. This can enable the power up and/or power down of entire racks or chassis of storage devices, which can ultimately reduce power consumption of the entire storage system.

It should be recognized that various combinations of embodiments described herein may be employed so long a modified shingle includes a different composition of storage devices than a pre-modified shingle. For example, one shingle modification may be based on an ordering of storage devices in the group and/or shingle, and another shingle modification may be based on other criteria of storage system and/or shingles (e.g., shingle capacity).

It should be understood that the embodiments described in the various flowcharts may be executed in parallel, in series, or a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Further, the embodiments described herein and shown in the various flowcharts may be implemented as entirely hardware embodiments (e.g., special-purpose hardware), entirely software embodiments (e.g., processor-readable instructions), or a combination thereof. In some embodiments, software embodiments can include multiple processes or threads, launched statically or dynamically as needed, or the like.

The embodiments described herein and shown in the various flowcharts may be implemented by computer instructions (or processor-readable instructions). These computer instructions may be provided to one or more processors to produce a machine, such that execution of the instructions on the processor causes a series of operational steps to be performed to create a means for implementing the embodiments described herein and/or shown in the flowcharts. In some embodiments, these computer instructions may be stored on machine-readable storage media, such as processor-readable non-transitory storage media.

The above specification, examples, and data provide a complete description of the manufacture and use of the composition of the invention. Since many embodiments of the invention can be made without departing from the spirit and scope of the invention, the invention resides in the claims hereinafter appended.

What is claimed is:

1. A method for storing data across a storage system, comprising:
    establishing a shingle of storage devices, wherein the shingle refers to a logical organization of a sub-group of more than one storage device selected from a larger group of storage devices;
    writing a plurality of data repair sets to one or more subsets of the storage devices in the shingle, wherein each data repair set includes at least one data block and at least one repair block, and wherein each block is stored on a different storage device in the one or more subsets in the shingle; and
    when a condition is satisfied, modifying the shingle to remove at least one storage device from the shingle and to add at least one other storage device to the shingle, wherein the at least one other storage device is in the group of storage devices and currently non-included in the shingle, and wherein the at least one removed storage device is removed from a logical tail of the shingle's organization of the sub-group of storage devices and the at least one other storage device is added to a logical head of the shingle's organization of the sub-group of storage devices.

2. The method of claim 1, further comprising, powering down the at least one removed storage device.

3. The method of claim 1, further comprising, powering up the at least one added other storage device.

4. The method of claim 1, further comprising, when a storage capacity of at least one of the storage devices in the shingle exceeds a predetermined threshold, satisfying the condition.

5. The method of claim 1, further comprising satisfying the condition based on a predetermined time period.

6. The method of claim 1, further comprising:
    when a capacity condition is satisfied for the group of storage device, determining a new group of storage devices; and
    determining a new shingle that logically organizes a new sub-group of storage devices from the larger new group of storage devices.

7. The method of claim 1, wherein modifying the shingle includes wrapping the shingle to a lowest ordered storage device in the group of storage devices that was previously removed from the shingle.

8. A system for storing data across a storage system, comprising:
    a group of storage devices; and
    at least one network device that performs actions, including
        establishing a shingle of storage devices, wherein the shingle refers to a logical organization of a sub-group of more than one storage device selected from the larger group of storage devices;
        writing a plurality of data repair sets to one or more subsets of the storage devices in the shingle, wherein each data repair set includes at least one data block and at least one repair block, and wherein each block is stored on a different storage device in the one or more subsets in the shingle; and
        when a condition is satisfied, modifying the shingle to remove at least one storage device from the shingle and to add at least one other storage device to the shingle, wherein the at least one other storage device is in the group of storage devices and currently non-included in the shingle, and wherein the at least one removed storage device is removed from a logical tail of the shingle's organization of the sub-group of storage devices and the at least one other storage device is added to a logical head of the shingle's organization of the sub-group of storage devices.

9. The system of claim 8, further comprising, powering down the at least one removed storage device.

10. The system of claim 8, further comprising, powering up the at least one added other storage device.

11. The system of claim 8, further comprising, when a storage capacity of at least one of the storage devices in the shingle exceeds a predetermined threshold, satisfying the condition.

12. The system of claim 8, further comprising:
    when a capacity condition is satisfied for the group of storage device, determining a new group of storage devices; and
    determining a new shingle that logically organizes a new sub-group of storage devices from the larger new group of storage devices.

13. The system of claim 8, wherein modifying the shingle includes wrapping the shingle to a lowest ordered storage device in the group of storage devices that was previously removed from the shingle.

14. A network computer for storing data across a storage system, comprising:
    a memory that stores instructions; and
    a processor that executes the instructions to perform actions, including
        establishing a shingle of storage devices, wherein the shingle refers to a logical organization of a sub-group of more than one storage device selected from a larger group of storage devices;

writing a plurality of data repair sets to one or more subsets of the storage devices in the shingle, wherein each data repair set includes at least one data block and at least one repair block, and wherein each block is stored on a different storage device in the one or more subsets in the shingle; and when a condition is satisfied, modifying the shingle to remove at least one storage device from the shingle and to add at least one other storage device to the shingle, wherein the at least one other storage device is in the group of storage devices and currently non-included in the shingle, and wherein the at least one removed storage device is removed from a logical tail of the shingle's organization of the sub-group of storage devices and the at least one other storage device is added to a logical head of the shingle's organization of the sub-group of storage devices.

15. The network computer of claim 14, wherein the processor that executes the instructions performs further actions, comprising, powering down the at least one removed storage device.

16. The network computer of claim 14, wherein the processor that executes the instructions performs further actions, comprising, when a storage capacity of at least one of the storage devices in the shingle exceeds a predetermined threshold, satisfying the condition.

17. The network computer of claim 14, wherein the processor that executes the instructions performs further actions, comprising, satisfying the condition based on a predetermined time period.

18. The network computer of claim 14, wherein the processor that executes the instructions performs further actions, comprising:
when a capacity condition is satisfied for the group of storage device, determining a new group of storage devices; and
determining a new shingle that logically organizes a new sub-group of storage devices from the larger new group of storage devices.

19. The network computer of claim 14, wherein modifying the shingle includes wrapping the shingle to a lowest ordered storage device in the group of storage devices that was previously removed from the shingle.

20. A processor readable non-transitory storage media that includes instructions for storing data across a storage system, wherein execution of the instructions by a processor performs actions, comprising:

establishing a shingle of storage devices, wherein the shingle refers to a logical organization of a sub-group of more than one storage device selected from a larger group of storage devices;

writing a plurality of data repair sets to one or more subsets of the storage devices in the shingle, wherein each data repair set includes at least one data block and at least one repair block, and wherein each block is stored on a different storage device in the one or more subsets in the shingle; and when a condition is satisfied, modifying the shingle to remove at least one storage device from the shingle and to add at least one other storage device to the shingle, wherein the at least one other storage device is in the group of storage devices and currently non-included in the shingle, and wherein the at least one removed storage device is removed from a logical tail of the shingle's organization of the sub-group of storage devices and the at least one other storage device is added to a logical head of the shingle's organization of the sub-group of storage devices.

21. The media of claim 20, further comprising, powering down the at least one removed storage device.

22. The media of claim 20, further comprising, powering up the at least one added other storage device.

23. The media of claim 20, further comprising, when a storage capacity of at least one of the storage devices in the shingle exceeds a predetermined threshold, satisfying the condition.

24. The media of claim 20, further comprising satisfying the condition based on a predetermined time period.

25. The media of claim 20, further comprising:
when a capacity condition is satisfied for the group of storage device, determining a new group of storage devices; and
determining a new shingle that logically organizes a new sub-group of storage devices from the larger new group of storage devices.

26. The media of claim 20, wherein modifying the shingle includes wrapping the shingle to a lowest ordered storage device in the group of storage devices that was previously removed from the shingle.

* * * * *

UNITED STATES PATENT AND TRADEMARK OFFICE
CERTIFICATE OF CORRECTION

PATENT NO. : 9,098,451 B1  
APPLICATION NO. : 14/550466  
DATED : August 4, 2015  
INVENTOR(S) : Rakitzis et al.

Page 1 of 1

It is certified that error appears in the above-identified patent and that said Letters Patent is hereby corrected as shown below:

In the specification

In Column 2, Line 48, delete "tem" and insert -- term --, therefor.

In Column 25, Line 34, delete "Process 1006" and insert -- Process 1000 --, therefor.

Signed and Sealed this
Nineteenth Day of April, 2016

Michelle K. Lee
*Director of the United States Patent and Trademark Office*